(12) United States Patent
Abdelmonem et al.

(10) Patent No.: US 9,042,497 B2
(45) Date of Patent: May 26, 2015

(54) METHOD AND APPARATUS FOR MITIGATING SIGNAL INTERFERENCE IN A FEEDBACK SYSTEM

(71) Applicant: ISCO International, LLC, Schaumburg, IL (US)

(72) Inventors: Amr Abdelmonem, Northbrook, IL (US); Mikhail Galeev, Palatine, IL (US); Sean S. Cordone, Chicago, IL (US); Howard Wong, Chicago, IL (US)

(73) Assignee: ISCO International, LLC, Schaumburg, IL (US)

( * ) Notice: Subject to any disclaimer, the term of this patent is extended or adjusted under 35 U.S.C. 154(b) by 0 days.

(21) Appl. No.: 13/963,413

(22) Filed: Aug. 9, 2013

(65) Prior Publication Data

US 2014/0269850 A1 Sep. 18, 2014

Related U.S. Application Data

(60) Provisional application No. 61/792,184, filed on Mar. 15, 2013.

(51) Int. Cl.
*H04B 1/10* (2006.01)
*H04B 1/709* (2011.01)
(Continued)

(52) U.S. Cl.
CPC ............ *H04B 1/709* (2013.01); *H04W 72/082* (2013.01); *H04L 5/0073* (2013.01); *H04B 1/7103* (2013.01); *H04B 15/00* (2013.01); *H04W 72/085* (2013.01); *H04W 24/08* (2013.01);
(Continued)

(58) Field of Classification Search
CPC ...... H04B 1/10; H04B 1/1027; H04B 1/1036; H04B 1/109; H04B 1/12; H04B 1/123; H04B 1/126; H04B 1/06
USPC .......... 375/316, 346, 349, 347, 259, 285, 229, 375/232, 233
See application file for complete search history.

(56) References Cited

U.S. PATENT DOCUMENTS 5,301,197 A * 4/1994 Yamada et al. ............... 714/704
5,640,385 A 6/1997 Long
(Continued)

FOREIGN PATENT DOCUMENTS

EP 2288061 A1 2/2011
WO 2008033369 A2 3/2008
(Continued)

OTHER PUBLICATIONS

Kim, Kihong, "Interference Mitigation in Wireless Communications", Aug. 23, 2005, 133 pages.

*Primary Examiner* — Siu Lee
(74) *Attorney, Agent, or Firm* — Guntin & Gust, PLC; Douglas Schnabel

(57) ABSTRACT

A system that incorporates the subject disclosure may include, for example, a process that includes adjusting a filter in electrical communication between an input terminal and a demodulator. The filter is applied to an information bearing signal, e.g., to mitigate interference, received at the input terminal, resulting in a filtered signal. An error signal is received, indicative of errors detected within information obtained by demodulation of a modulated carrier of the filtered signal. A modified filter state is determined in response to the error signal and the filter is adjusted according to the modified filter state, e.g., to improve mitigation of the interference. Other embodiments are disclosed.

20 Claims, 22 Drawing Sheets

(51) Int. Cl.
*H04W 72/08* (2009.01)
*H04L 5/00* (2006.01)
*H04B 1/7103* (2011.01)
*H04B 15/00* (2006.01)
*H04W 64/00* (2009.01)
*H04B 17/00* (2006.01)
*H04W 52/04* (2009.01)
*H04W 24/08* (2009.01)

(52) U.S. Cl.
CPC ............ *H04W64/006* (2013.01); *H04B 17/00* (2013.01); *H04W 52/04* (2013.01); *H04B 1/1036* (2013.01)

(56) References Cited

U.S. PATENT DOCUMENTS

| | | | |
|---|---|---|---|
| 5,852,630 A * | 12/1998 | Langberg et al. | 375/219 |
| 6,133,942 A | 10/2000 | Lee | |
| 6,580,899 B1 | 6/2003 | Dalgleish et al. | |
| 6,631,266 B1 | 10/2003 | Lee et al. | |
| 6,671,338 B1 | 12/2003 | Gamal et al. | |
| 6,718,166 B2 | 4/2004 | Cordone | |
| 6,850,764 B1 | 2/2005 | Patel | |
| 6,976,044 B1 | 12/2005 | Kilani | |
| 7,003,310 B1 | 2/2006 | Youssefmir et al. | |
| 7,359,691 B2 | 4/2008 | Adachi et al. | |
| 7,525,942 B2 | 4/2009 | Cordone | |
| 7,929,953 B2 | 4/2011 | Jiang | |
| 8,055,191 B2 | 11/2011 | Unger | |
| 8,219,105 B2 | 7/2012 | Kronestedt et al. | |
| 8,238,954 B2 | 8/2012 | Liu et al. | |
| 8,412,256 B2 | 4/2013 | Lee et al. | |
| 8,422,469 B2 | 4/2013 | Guvenc | |
| 2002/0110206 A1 | 8/2002 | Becker et al. | |
| 2003/0081277 A1* | 5/2003 | Corbeil et al. | 359/110 |
| 2003/0193366 A1* | 10/2003 | Barksdale | 329/315 |
| 2004/0042561 A1* | 3/2004 | Ho et al. | 375/316 |
| 2004/0088637 A1* | 5/2004 | Wada | 714/768 |
| 2005/0117676 A1 | 6/2005 | Liu | |
| 2007/0173252 A1 | 7/2007 | Jiang | |
| 2010/0118921 A1* | 5/2010 | Abdelmonem et al. | 375/148 |
| 2010/0220670 A1 | 9/2010 | Teo et al. | |
| 2010/0279724 A1 | 11/2010 | Li et al. | |
| 2010/0310026 A1 | 12/2010 | Sikri et al. | |
| 2010/0315970 A1 | 12/2010 | Ramamurthi et al. | |
| 2011/0183679 A1 | 7/2011 | Moon et al. | |
| 2011/0258678 A1 | 10/2011 | Cowling et al. | |
| 2011/0310747 A1 | 12/2011 | Seo et al. | |
| 2012/0021753 A1 | 1/2012 | Damnjanovic et al. | |
| 2012/0028663 A1 | 2/2012 | Nejatian et al. | |
| 2012/0207038 A1 | 8/2012 | Choi et al. | |
| 2012/0213116 A1 | 8/2012 | Koo et al. | |
| 2012/0236731 A1 | 9/2012 | Beaudin | |
| 2013/0029658 A1 | 1/2013 | Jagger et al. | |
| 2013/0058300 A1 | 3/2013 | Perets et al. | |
| 2013/0090125 A1 | 4/2013 | Clifton et al. | |
| 2013/0107737 A1 | 5/2013 | Lee et al. | |
| 2013/0115999 A1 | 5/2013 | Sirotkin et al. | |

FOREIGN PATENT DOCUMENTS

| | | |
|---|---|---|
| WO | 2009019074 | 2/2009 |
| WO | WO2009/019074 | 2/2009 |
| WO | 2012116755 | 9/2012 |
| WO | 2012172476 | 12/2012 |
| WO | WO2012/172476 | 12/2012 |

* cited by examiner

800 ns shown in FIG. 16;
METHOD AND APPARATUS FOR MITIGATING SIGNAL INTERFERENCE IN A FEEDBACK SYSTEM

CROSS-REFERENCE TO RELATED APPLICATIONS

The present application claims the benefit of priority to U.S. Provisional Application No. 61/792,184 filed on Mar. 15, 2013, entitled, "Method and apparatus for Interference Detection and Mitigation," which is hereby incorporated herein by reference in its entirety.

FIELD OF THE DISCLOSURE

The subject disclosure is related to mitigating signal interference in a feedback system.

BACKGROUND

In most communication environments involving short range or long range wireless communications, interference from unexpected wireless sources can impact the performance of a communication system leading to lower throughput, dropped calls, reduced bandwidth which can cause traffic congestion, or other adverse effects, which are undesirable.

Some service providers of wireless communication systems have addressed interference issues by adding more communication nodes, policing interferers, or utilizing antenna steering techniques to avoid interferers.

BRIEF DESCRIPTION OF THE DRAWINGS

Reference will now be made to the accompanying drawings, which are not necessarily drawn to scale, and wherein.

DETAILED DESCRIPTION

Figure 1:
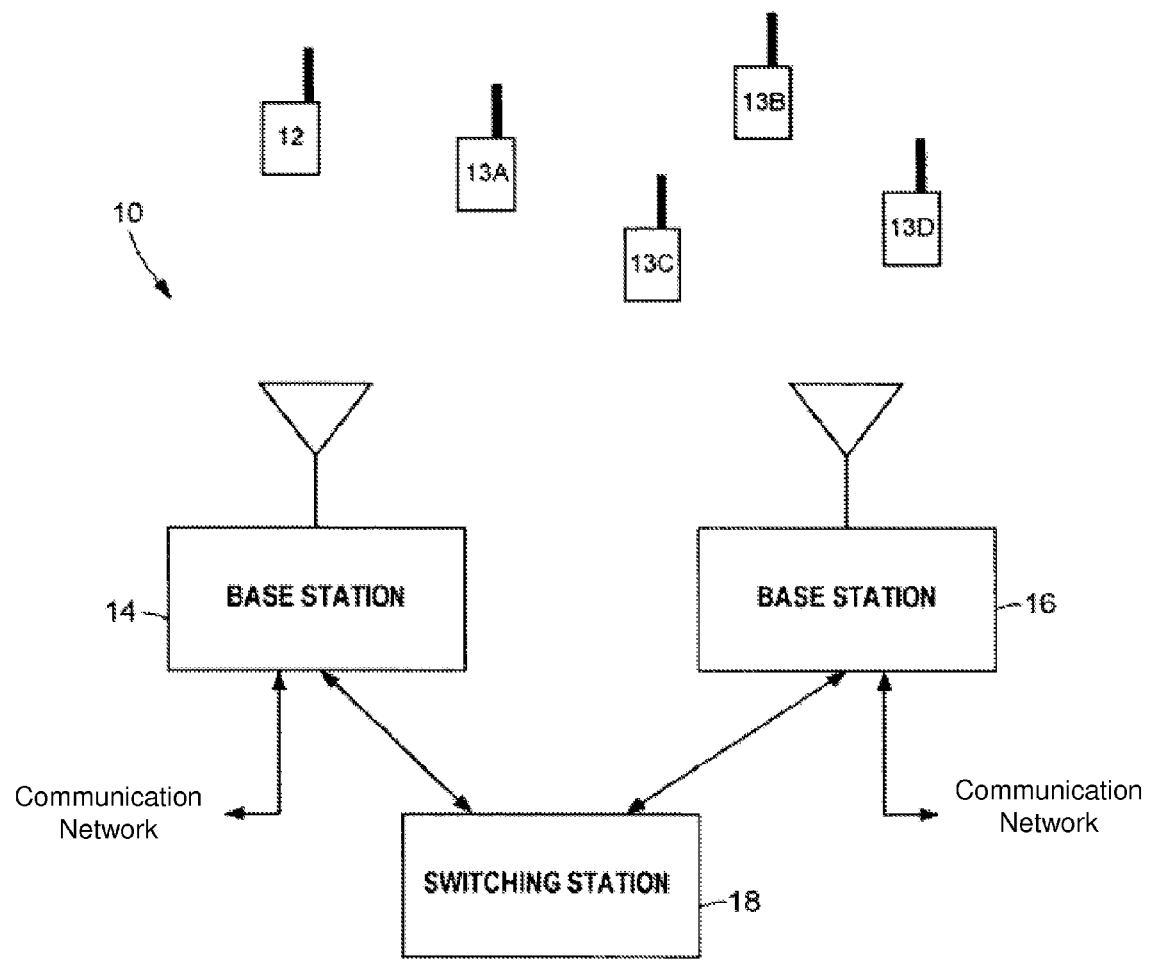
FIG. 1 depicts an illustrative embodiment of a communication system.

The subject disclosure describes, among other things, illustrative embodiments for detecting and mitigating interference signals. Other embodiments are included in the subject disclosure.

One embodiment of the subject disclosure includes a process for determining at least one threshold for detecting signal interference in a first group of segments occurring in a first radio frequency spectrum of a first wireless communication system. Interference is determined within a frequency spectrum of an information bearing signal according to the at least one threshold for detecting signal interference. The information bearing signal is received at an input terminal and includes a modulated carrier waveform. A mitigation state is determined responsive to the determining of the interference, and a system parameter is adjusted according to the mitigation state, resulting in a pre-adjusted system parameter. A first error signal is received, indicative of errors detected within information obtained by demodulation of the modulated carrier waveform of a signal received according to the pre-adjusted system parameter. A modified mitigation state is determined in response to the first error signal and the pre-adjusted system parameter is adjusted according to the modified mitigation state.

Another embodiment of the subject disclosure includes a device having a memory to store instructions and a processor in communication with the memory. Upon executing the instructions, the processor performs operations including determining a filter state to mitigate interference and adjusting a filter according to the filter state. The filter is provided between an input terminal and a demodulator to filter an information bearing signal comprising a modulated carrier received at the input terminal, resulting in a filtered signal. A first error signal is received, indicative of errors detected within information obtained by demodulation of the modulated carrier of the filtered signal and a modified filter state is determined in response to the first error signal. The filter is adjusted according to the modified filter state.

Yet another embodiment of the subject disclosure includes a machine-readable storage device having instructions. The instructions, when executed by a processor, cause the processor to perform operations including adjusting a filter in electrical communication between an input terminal and a demodulator to filter an information bearing signal received at the input terminal, resulting in a filtered signal. An error signal is received, indicative of errors detected within information obtained by demodulation of a modulated carrier of the filtered signal. A modified filter state is determined in response to the error signal and the filter is adjusted according to the modified filter state.

Interference signals can be generated from various sources including bidirectional amplifiers, unintended radiation from communication equipment (e.g., faulty transmitters of the carrier or other carriers), wireless microphones, garage door openers and similar production equipment, cross-border cellular (reduced buffer zones), federal and military installations, television transmissions, intermodulation from other transmitters, intermodulation from own faulty components and connectors, and so forth.

The embodiments of the subject disclosure can be performed singly or in combination by a mobile communication device, a stationary communication device, base stations, a wireless hub used by a satellite communication system, and/or a system or systems in communication with the base stations, the wireless hub, and/or mobile communication devices.

As shown in FIG. 1, an exemplary telecommunication system 10 may include mobile units 12, 13A, 13B, 13C, and 13D, a number of base stations, two of which are shown in FIG. 1 at reference numerals 14 and 16, and a switching station 18 to which each of the base stations 14, 16 may be interfaced. The base stations 14, 16 and the switching station 18 may be collectively referred to as network infrastructure.

During operation, the mobile units 12, 13A, 13B, 13C, and 13D exchange voice, data or other information with one of the base stations 14, 16, each of which is connected to a conventional land line communication network. For example, information, such as voice information, transferred from the mobile unit 12 to one of the base stations 14, 16 is coupled from the base station to the communication network to thereby connect the mobile unit 12 with, for example, a land line telephone so that the land line telephone may receive the voice information. Conversely, information, such as voice information may be transferred from a land line communication network to one of the base stations 14, 16, which in turn transfers the information to the mobile unit 12.

The mobile units 12, 13A, 13B, 13C, and 13D and the base stations 14, 16 may exchange information in either narrow band or wide band format. For the purposes of this description, it is assumed that the mobile unit 12 is a narrowband unit and that the mobile units 13A, 13B, 13C, and 13D are wideband units. Additionally, it is assumed that the base station 14 is a narrowband base station that communicates with the mobile unit 12 and that the base station 16 is a wideband digital base station that communicates with the mobile units 13A, 13B, 13C, and 13D.

Narrow band format communication takes place using, for example, narrowband 200 kilohertz (KHz) channels. The Global system for mobile phone systems (GSM) is one example of a narrow band communication system in which the mobile unit 12 communicates with the base station 14 using narrowband channels. Alternatively, the mobile units 13A, 13B, 13C, and 13D communicate with the base stations 16 using a form of digital communications such as, for example, code-division multiple access (CDMA), Universal Mobile Telecommunications System (UMTS), 3GPP Long Term Evolution or other next generation wireless access technologies. CDMA digital communication, for instance, takes place using spread spectrum techniques that broadcast signals having wide bandwidths, such as, for example, 1.2288 megahertz (MHz) bandwidths.

The switching station 18 is generally responsible for coordinating the activities of the base stations 14, 16 to ensure that the mobile units 12, 13A, 13B, 13C, and 13D are constantly in communication with the base station 14, 16 or with some other base stations that are geographically dispersed. For example, the switching station 18 may coordinate communication handoffs of the mobile unit 12 between the base stations 14 and another base station as the mobile unit 12 roams between geographical areas that are covered by the two base stations.

One particular problem that may arise in the telecommunication system 10 is when the mobile unit 12 or the base station 14, each of which communicates using narrowband channels, interferes with the ability of the base station 16 to receive and process wideband digital signals from the digital mobile units 13A, 13B, 13C, and 13D. In such a situation, the narrowband signal transmitted from the mobile unit 12 or the base station 14 may interfere with the ability of the base station 16 to properly receive wideband communication signals.

Figure 2:
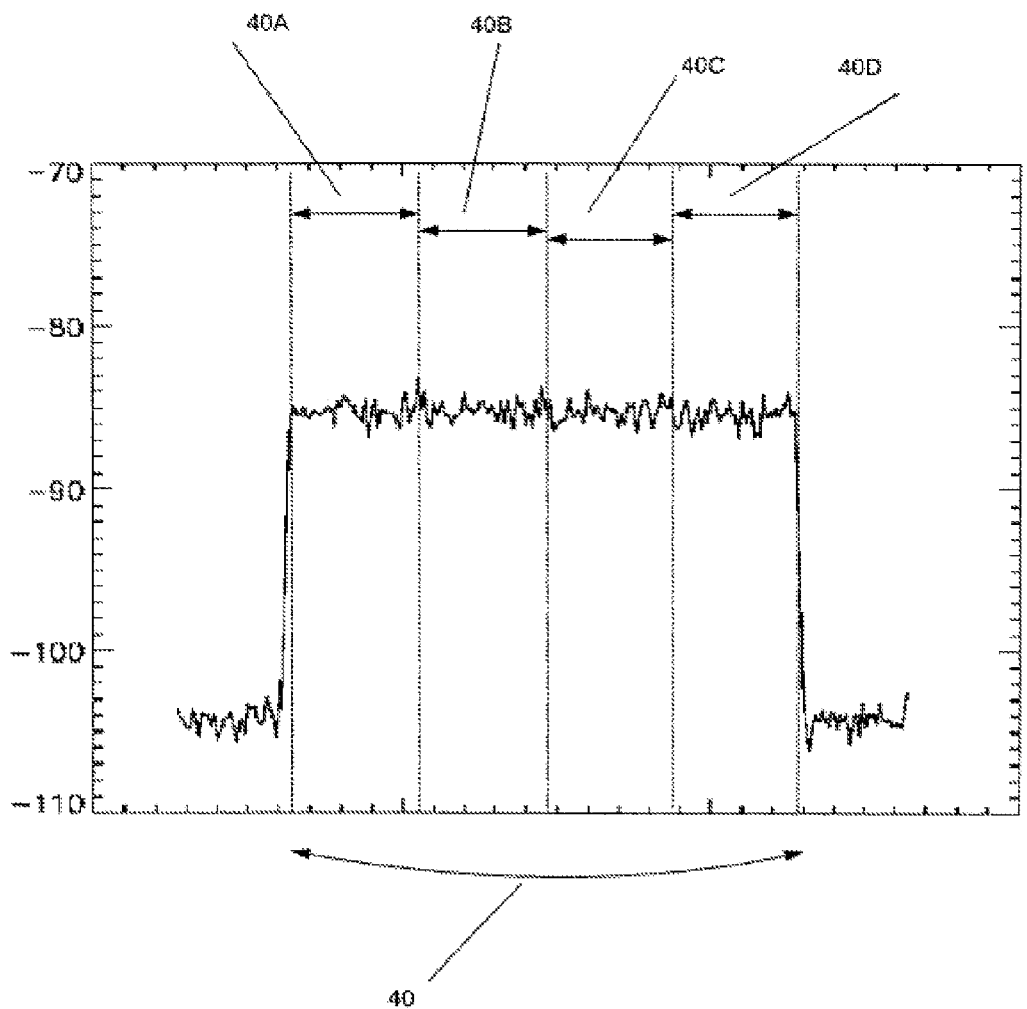
FIG. 2 depicts an illustrative embodiment of a frequency spectrum of a four carrier CDMA signal.
Figure 3:
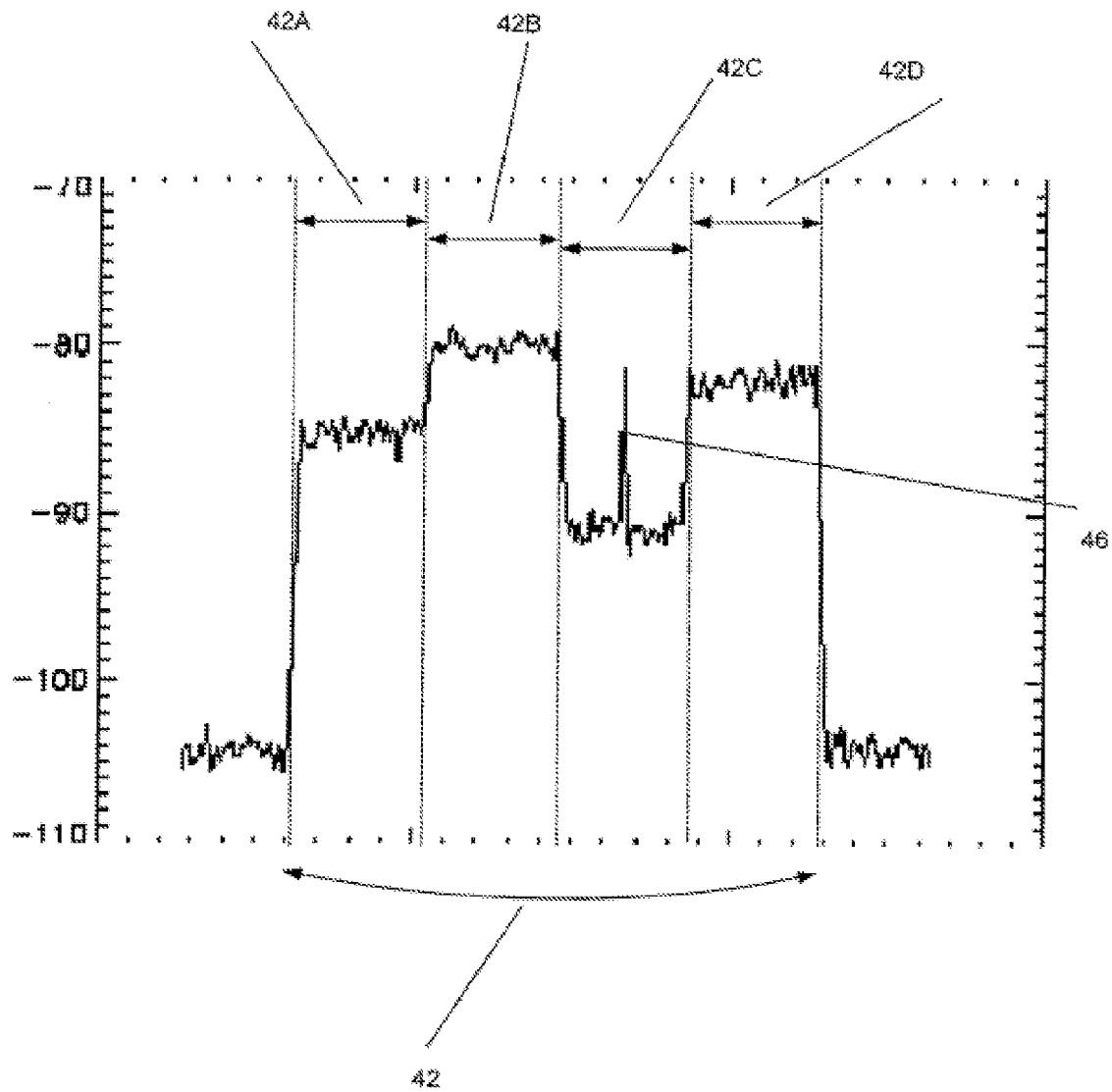
FIG. 3 depicts an illustrative embodiment of a frequency spectrum of a four carrier CDMA signal showing unequal power balancing between the four CDMA carriers and including a narrowband interferer.

As will be readily appreciated, the base station 16 may receive and process wideband digital signals from more than one of the digital mobile units 13A, 13B, 13C, and 13D. For example, the base station 16 may be adapted to receive and process four CDMA carriers 40A-40D that fall within a multi-carrier CDMA signal 40, as shown in FIG. 2. In such a situation, narrowband signals transmitted from more than one mobile units, such as, the mobile unit 12, may interfere with the ability of the base station 16 to properly receive wideband communication signals on any of the four CDMA carriers 40A-40D. For example, FIG. 3 shows a multi-carrier CDMA signal 42 containing four CDMA carriers 42A, 42B, 42C and 42D adjacent to each other wherein one of the CDMA carriers 42C has a narrowband interferer 46 therein. As shown in FIG. 3, it is quite often the case that the signal strengths of the CDMA carrier signals 42A-42D are not equal.

As disclosed in detail hereinafter, a system and/or a method for multiple channel adaptive filtering or interference suppression may be used in a communication system. In particular, such a system or method may be employed in a wideband communication system to protect against, or to report the presence of, narrowband interference, which has deleterious effects on the performance of the wideband communication system. Additionally, such a system and method may be operated to eliminate interference in CDMA carriers having other CDMA carriers adjacent thereto.

Figure 4:
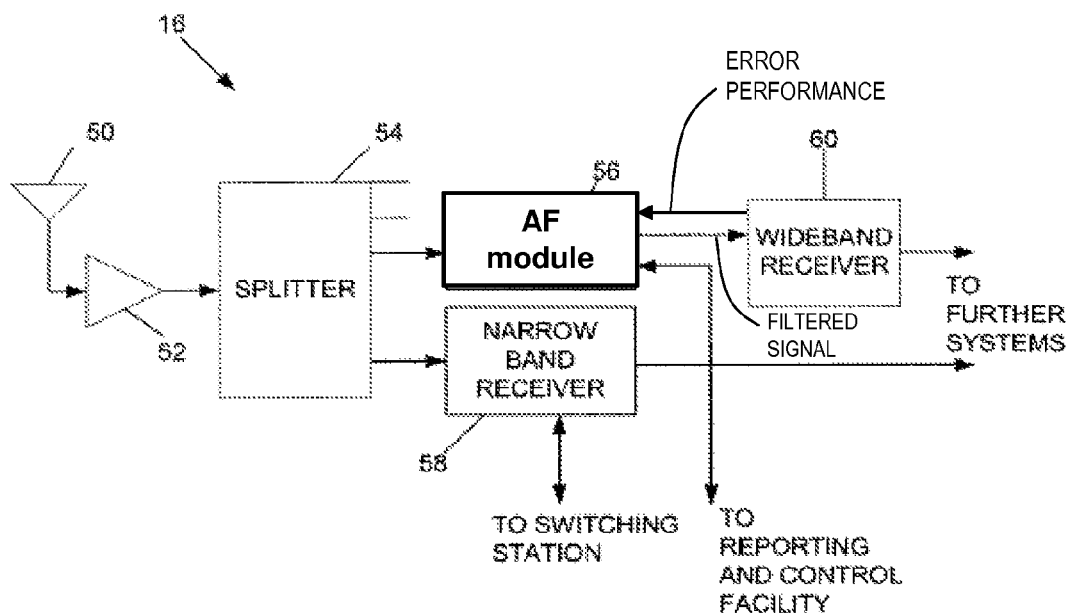
FIG. 4 depicts an illustrative embodiment of a base station of FIG. 1.

As shown in FIG. 4, the signal reception path of the base station 16, which was described as receiving narrowband interference from the mobile unit 12 in conjunction with FIG. 1, includes an antenna 50 that provides signals to a low noise amplifier (LNA) 52. The output of the LNA 52 is coupled to a splitter 54 that splits the signal from the LNA 52 into a number of different paths, one of which may be coupled to an adaptive front end 56 and another of which may be coupled to a narrowband receiver 58. The output of the adaptive front end 56 is coupled to a wideband receiver 60, which may, for example, be embodied in a CDMA receiver or any other suitable wideband receiver. The narrowband receiver 58 may be embodied in a 15 KHz bandwidth receiver or in any other suitable narrowband receiver. Although only one signal path is shown in FIG. 4, it will be readily understood to those having ordinary skill in the art that such a signal path is merely exemplary and that, in reality, a base station may include two or more such signal paths that may be used to process main and diversity signals received by the base station 16.

It will be readily understood that the illustrations of FIG. 4 can also be used to describe the components and functions of other forms of communication devices such as a small base station, a femto cell, a WiFi router or access point, a cellular phone, a smart phone, a laptop computer, a tablet, or other forms of wireless communication devices suitable for applying the principles of the subject disclosure. Accordingly, such communication devices can include variants of the components shown in FIG. 4 and perform the functions that will be described below. For illustration purposes only, the descriptions below will address the base station 16 with an understanding that these embodiments are exemplary and non-limiting to the subject disclosure.

Referring back to FIG. 4, the outputs of the narrowband receiver 58 and the wideband receiver 60 can be coupled to other systems within the base station 16. Such systems may perform voice and/or data processing, call processing or any other desired function. Additionally, the adaptive front end module 56 may also be communicatively coupled, via the Internet, telephone lines, cellular network, or any other suitable communication systems, to a reporting and control facility that is remote from the base station 16. In some networks, the reporting and control facility may be integrated with the switching station 18. The narrowband receiver 58 may be communicatively coupled to the switching station 18 and may respond to commands that the switching station 18 issues.

Each of the components 50-60 of the base station 16 shown in FIG. 4, except for the adaptive front end module 56, may be found in a conventional wideband cellular base station 16, the details of which are well known to those having ordinary skill in the art. It will also be appreciated by those having ordinary skill in the art that FIG. 4 does not disclose every system or subsystem of the base station 16 and, rather, focuses on the relevant systems and subsystems to the subject disclosure. In particular, it will be readily appreciated that, while not shown in FIG. 4, the base station 16 can include a transmission system or other subsystems. It is further appreciated that the adaptive front end module 56 can be an integral subsystem of a wideband cellular base station 16, or can be a modular subsystem that can be physically placed in different locations of a receiver chain of the base station 16, such as at or near the antenna 50, at or near the LNA 52, or at or near the wideband receiver 60.

During operation of the base station 16, the antenna 50 receives CDMA carrier signals that are broadcast from the mobile unit 13A, 13B, 13C and 13D and couples such signals to the LNA 52, which amplifies the received signals and couples the amplified signals to the splitter 54. The splitter 54 splits the amplified signal from the LNA 52 and essentially places copies of the amplified signal on each of its output lines. The adaptive front end module 56 receives the signal from the splitter 54 and, if necessary, filters the CDMA carrier signal to remove any undesired narrowband interference and couples the filtered CDMA carrier signal to the wideband receiver 60.

As noted previously, FIG. 2 illustrates an ideal frequency spectrum 40 of a CDMA carrier signal that may be received at the antenna 50, amplified and split by the LNA 52 and the splitter 54 and coupled to the adaptive front end module 56. If the CDMA carrier signal received at the antenna 50 has a frequency spectrum 40 as shown in FIG. 2 without any narrowband interference, the adaptive front end will not filter the CDMA carrier signal and will simply couple the wideband signal directly through the adaptive front end module 56 to the wideband receiver 60.

Figure 5:
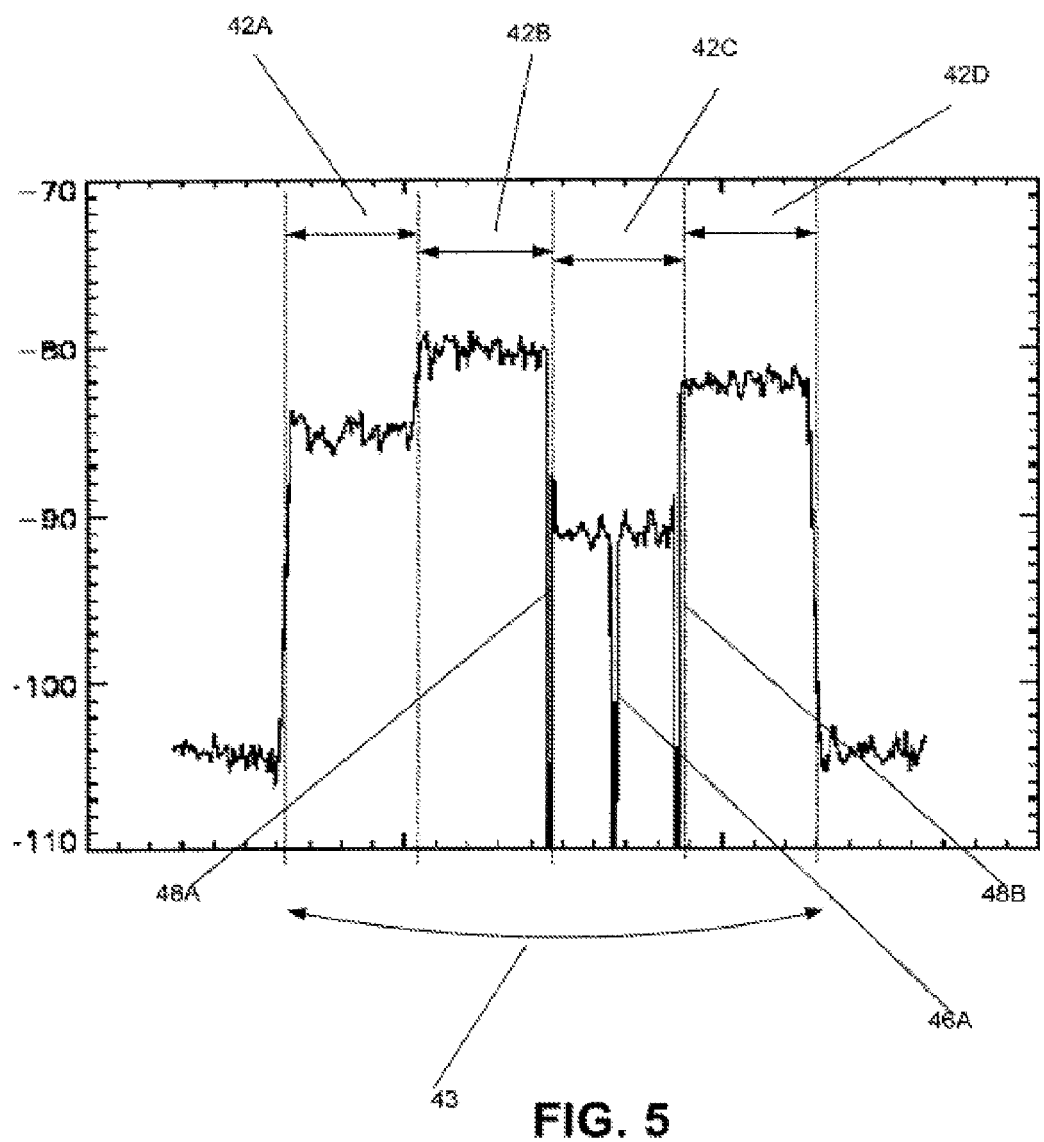
FIG. 5 depicts an illustrative embodiment of a frequency spectrum of a four carrier CDMA signal having four CDMA carriers with suppression of a narrowband interferer that might otherwise result in falsing.

However, as noted previously, it is possible that the CDMA carrier signal transmitted by the mobile units 13A-13D and received by the antenna 50 has a frequency spectrum as shown in FIG. 3 which contains a multi-carrier CDMA signal 42 that includes not only the four CDMA carriers 42A, 42B, 42C and 42D from the mobile units 13A, 13B, 13C and 13D having unequal CDMA carrier strengths, but also includes narrowband interferer 46, as shown in FIG. 3, which in this illustration is caused by mobile unit 12. If a multi-carrier CDMA signal having a multi-carrier CDMA signal 42 including narrowband interferer 46 is received by the antenna 50 and amplified, split and presented to the adaptive front end module 56, it will filter the multi-carrier CDMA signal 42 to produce a filtered frequency spectrum 43 as shown in FIG. 5.

The filtered multi-carrier CDMA signal 43 has the narrowband interferer 46 removed, as shown by the notch 46A. The filtered multi-carrier CDMA signal 43 is then coupled from the adaptive front end module 56 to the wideband receiver 60, so that the filtered multi-carrier CDMA signal 43 may be demodulated. Although some of the multi-carrier CDMA signal 42 was removed during filtering by the adaptive front end module 56, sufficient multi-carrier CDMA signal 43 remains to enable the wideband receiver 60 to recover the information that was broadcast by mobile unit(s). Accordingly, in general terms, the adaptive front end module 56 selectively filters multi-carrier CDMA signals to remove narrowband interference therefrom. Further detail regarding the adaptive front end module 56 and its operation is provided below in conjunction with FIGS. 6-20.

In some embodiments, the wideband receiver 60 implements an error control function configured to detect errors in a bit stream obtained by demodulation of the CDMA signal 43. The error control function can include an error detection function and in at least some instances, an error correction function according to any of a variety of well understood techniques. By way of non-limiting example, some error control techniques rely upon a number of redundant bits incorporated in a transmitted segment, e.g., a block, of a bit stream. An algorithm, such as a parity or a hash can be performed on a received bit stream, the results being compared, e.g., to the redundant bits. A favorable comparison, e.g., resulting in expected results, can be interpreted as error-free. An unfavorable comparison, e.g., resulting in a departure from expected results, can be interpreted as an error. Depending upon the particular error detection and/or correction algorithm, further distinction can be made as to whether a detected error is correctable or not.

One category of channel coding using structured sequences is known as automatic repeat request (ARQ). An ARQ technique simply recognizes the occurrence of an error and requests that the sender retransmit the message, e.g., packet or block of the bit stream. Other categories of channel coding using structured sequences are known as forward error correction (FEC) techniques. Such FEC techniques are capable of automatically correcting the errors, generally, within specified limitations. The techniques can be further categorized under block coding and convolutional coding.

As illustrated in FIG. 4, the wideband receiver 60, implementing an error detection and/or correction function, can provide a signal to the adaptive filter module 56 indicating error information. Such information can include the occurrence of an error, an indication as to whether the error is correctable or not, and perhaps other information, such as an indication of synchronization or a lack thereof. One or more of the wideband receiver 60 and the adaptive filter 56 can count errors, e.g., distinguishing between correctable and uncorrectable, synchronization status, etc. Such error information can be used to estimate or otherwise determine effectiveness of one or more filters implemented by the adaptive filter module 56, such as the notch filter in the illustrative example. As will be discussed in more detail below, the error information can be used to adjust one or more parameters of the interference filter(s) implemented by the adaptive filter module 56. For example, an indication of errors, such as a total number over a monitor period, a frequency, etc., can serve as an motivation to adjust the interference filter in an attempt to improve the error performance, e.g., reduce a total number of errors, an error rate, etc. In at least some embodiments, the error performance signal can be used in a feedback loop controlling one or more features of the filter, such as a filter width, shape, depth, etc.

Figure 6:
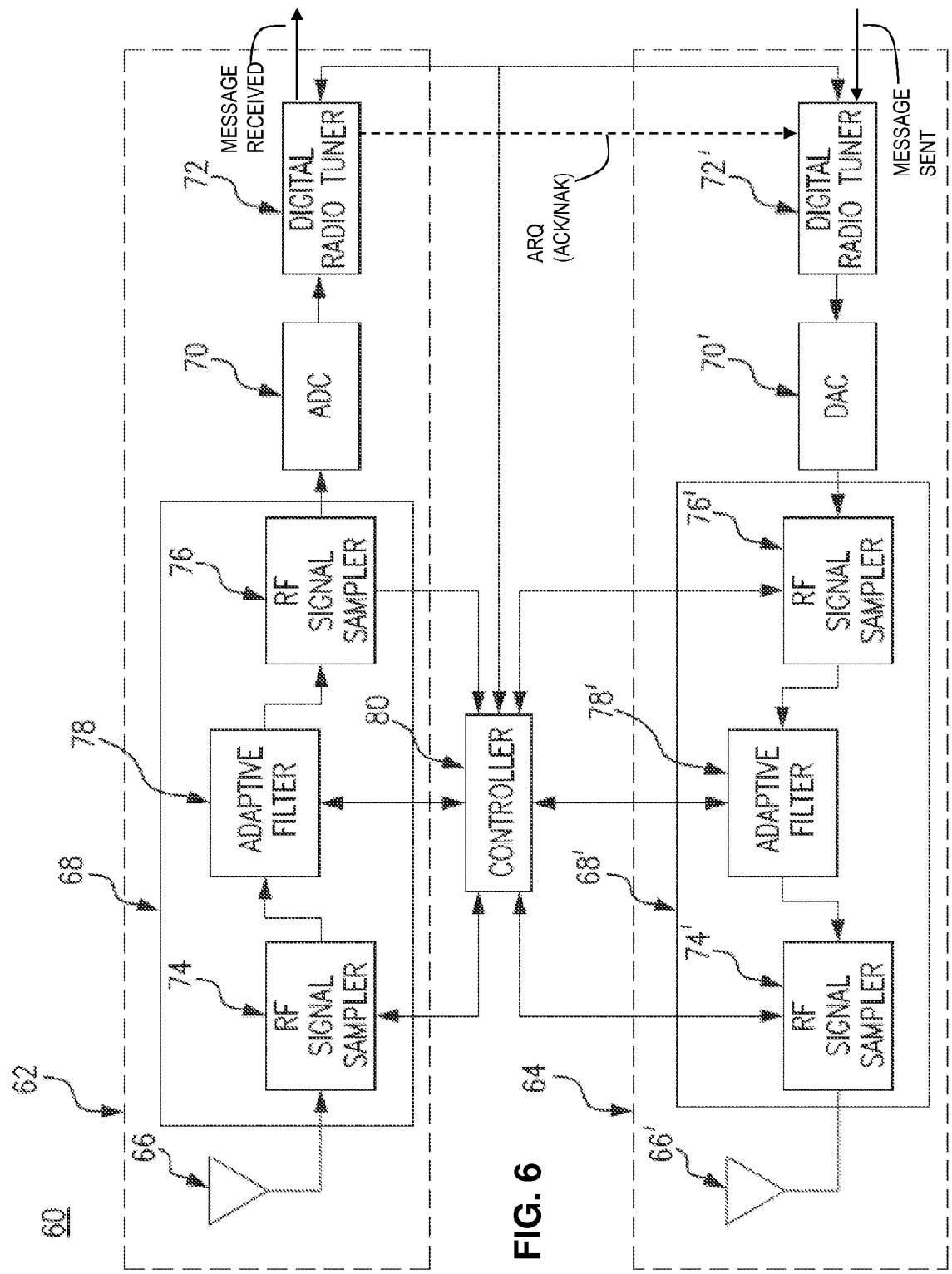
FIG. 6 depicts an illustrative embodiment of an interference detection and mitigation system.

FIG. 6 depicts another example embodiment of the adaptive front end module 56. As noted earlier, the adaptive front end module 56 can be utilized by any communication device including cellular phones, smartphones, tablets, small base stations, femto cells, WiFi access points, and so on. In the illustration of FIG. 6, the adaptive front end module 56 can include a radio 60 comprising two stages, a receiver stage 62 and a transmitter stage 64, each coupled to an antenna assembly 66, 66', which may comprise one of more antennas for the radio 60. The radio 60 has a first receiver stage coupled to the antenna assembly 66 and includes an adaptive front-end controller 68 that receives the input RF signal from the antenna and performs adaptive signal processing on that RF signal before providing the modified RF signal to an analog-to-digital converter 70, which then passes the adapted RF signal to a digital RF tuner 72.

As shown in FIG. 6, the adaptive front end controller 68 of the receiver stage 62 includes two RF signal samplers 74, 76 connected between an RF adaptive filter stage 78 that is controlled by controller 80. The adaptive filter stage 78 may have a plurality of tunable digital filters that can sample an incoming signal and selectively provide bandpass or bandstop signal shaping of an incoming RF signal, whether it is an entire wideband communication signal or a narrowband signal or various combinations of both. A controller 80 is coupled to the samplers 74, 76 and filter stage 78 and serves as an RF link adapter that along with the sampler 74 monitors the input RF signal from the antenna 66 and determines various RF signal characteristics such as the interferences and noise within the RF signal. The controller 80 is configured to execute any number of a variety of signal processing algorithms to analyze the received RF signal, and determine a filter state for the filter stage 78.

By providing tuning coefficient data to the filter stage 78, the adaptive front end controller 68 acts to pre-filter the received RF signal before the signal is sent to the RF tuner 72, which analyzes the filtered RF signal for integrity and/or for other applications such as cognitive radio applications. After filtering, the radio tuner 72 may then perform channel demodulation, data analysis, and local broadcasting functions. The RF tuner 72 may be considered the receiver side of an overall radio tuner, while RF tuner 72' may be considered the transmitter side of the same radio tuner. Prior to sending the filtered RF signal, the sampler 76 may provide an indication of the filtered RF signal to the controller 80 in a feedback manner for further adjusting of the adaptive filter stage 78.

In some examples, the adaptive front-end controller 68 is synchronized with the RF tuner 72 by sharing a master clock signal communicated between the two. For example, cognitive radios operating on a 100 μs response time can be synchronized such that for every clock cycle the adaptive front end analyzes the input RF signal, determines an optimal configuration for the adaptive filter stage 78, filters that RF signal into the filtered RF signal and communicates the same to the radio tuner 72 for cognitive analysis at the radio. By way of example, cellular phones may be implemented with a 200 μs response time on filtering. By implementing the adaptive front end controller 68 using a field programmable gate array configuration for the filter stage, wireless devices may identify not only stationary interference, but also non-stationary interference, of arbitrary bandwidths on that moving interferer.

In some implementations, the adaptive front-end controller 68 may filter interference or noise from the received incoming RF signal and pass that filtered RF signal to the tuner 72. In other examples, such as cascaded configurations in which there are multiple adaptive filter stages, the adaptive front-end controller 68 may be configured to apply the filtered signal to an adaptive bandpass filter stage to create a passband portion of the filtered RF signal. For example, the radio tuner 72 may communicate information to the controller 68 to instruct the controller that the radio is only looking at a portion of an overall RF spectrum and thus cause the adaptive front-end controller 68 not to filter certain portions of the RF spectrum and thereby bandpass only those portions. The integration between the radio tuner 72 and the adaptive front-end controller 68 may be particularly useful in dual-band and tri-band applications in which the radio tuner 72 is able to communicate over different wireless standards, such as GSM or UMTS standards.

The algorithms that may be executed by the controller 80 are not limited to interference detection and filtering of interference signals. In some configurations the controller 80 may execute a spectral blind source separation algorithm that looks to isolate two sources from their convolved mixtures. The controller 80 may execute a signal to interference noise ratio (SINR) output estimator for all or portions of the RF signal. The controller 80 may perform bidirectional transceiver data link operations for collaborative retuning of the adaptive filter stage 78 in response to instructions from the radio tuner 72 or from data the transmitter stage 64. The controller 80 can determine filter tuning coefficient data for configuring the various adaptive filters of stage 78 to properly filter the RF signal. The controller 80 may also include a data interface communicating the tuning coefficient data to the radio tuner 72 to enable the radio tuner 72 to determine filtering characteristics of the adaptive filter 78.

In one embodiment the filtered RF signal may be converted from a digital signal to an analog signal within the adaptive front-end controller 68. This allows the controller 68 to integrate in a similar manner to conventional RF filters. In other examples, a digital interface may be used to connect the adaptive front-end controller 68 with the radio tuner 72, in which case the ADC 70 would not be necessary.

In some embodiments, the digital RF tuner 72 includes a demodulator providing a demodulated bit stream as output. Error detection and/or correction techniques can be applied to the demodulated bit stream output as disclosed herein. For example, the error detection and/or correction can be implemented within the digital RF tuner 72. Error signal(s) can be forwarded to the controller 80, which can be configured to implement an adaptive filter algorithm based on the error signal(s). An error signal in an ARQ system can include an acknowledgement signal (ACK) that a packet, block or message was received correctly, or a negative acknowledgement message (NAK) that the packet, block or message was not received correctly. Although the ACK/NAK signal is shown in phantom directed from the receiver digital radio tuner 72 to the transmitter digital radio tuner 72' to cause a suitable ACK/NAK message to be transmitted to a remote message source. An ACK/NAK signal, when used, can also be provided to the controller 80 as an indication of error performance. The controller 80, in turn, can implement any of the algorithms or techniques disclosed herein to adjust or otherwise modify a setting of the adaptive filter 78, 78' in response to the error signal to improve mitigation of any interference.

The above discussion is in the context of the receiver stage 62. Similar elements are shown in the transmitter stage 64, but bearing a prime. The elements in the transmitter stage 64 may be similar to those of the receiver 62, with the exception of the digital to analog converter (DAC) 70' and other adaptations to the other components shown with a prime in the reference numbers. Furthermore, some or all of these components may in fact be executed by the same corresponding structure in the receiver stage 62. For example, the RF receiver tuner 72 and the transmitter tuner 72' may be performed by a single tuner device. The same may be true for the other elements, such as the adaptive filter stages 78 and 78', which may both be implemented in a single FPGA, with different filter elements in parallel for full duplex (simultaneous) receive and transmit operation.

Figure 7:
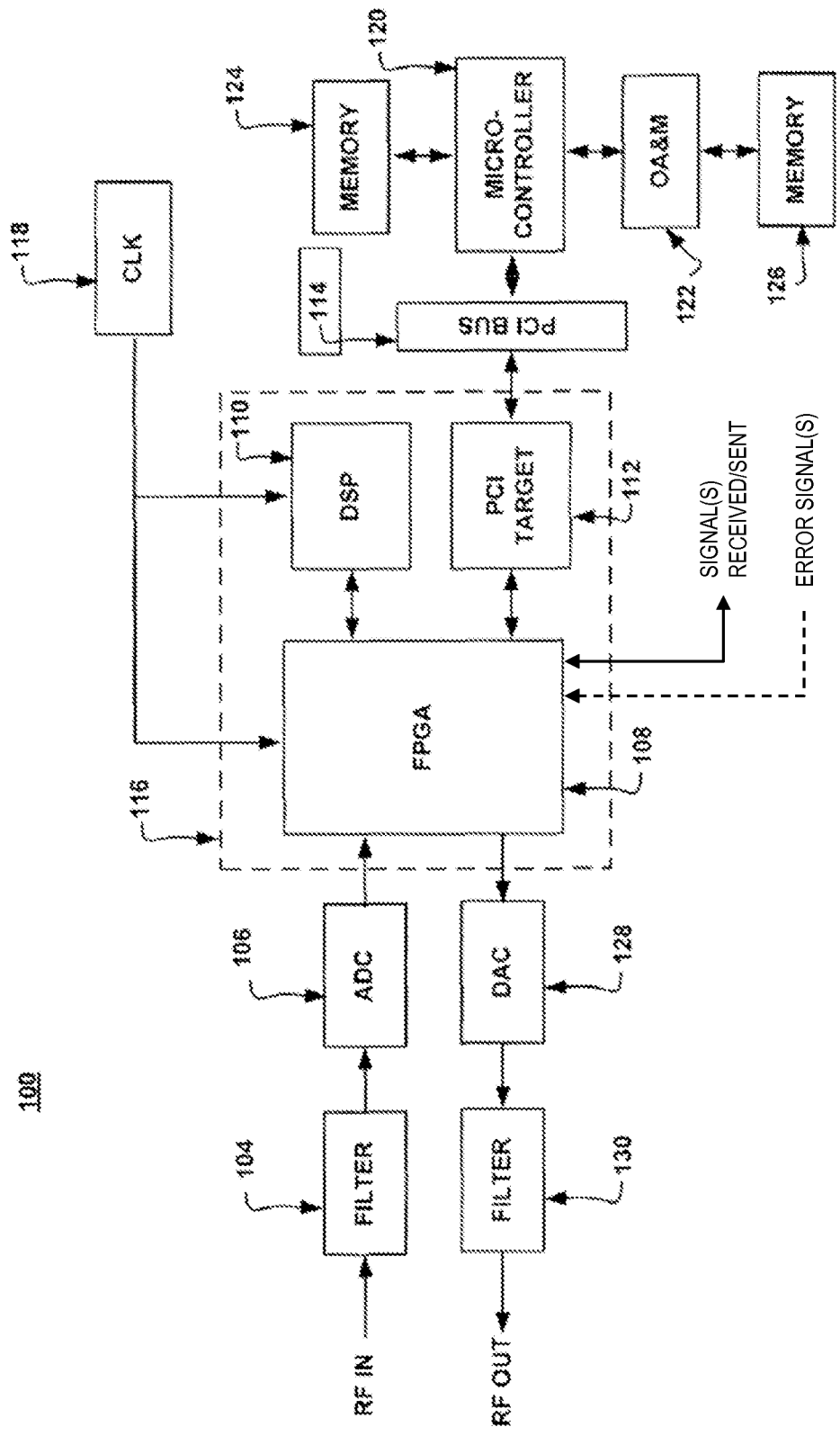
FIG. 7 depicts an illustrative embodiment of an interference detection and mitigation system.

FIG. 7 illustrates another example implementation of an adaptive front-end controller 100. Input RF signals are received at an antenna (not shown) and coupled to an initial analog filter 104, such as low noise amplifier (LNA) block, then digitally converted via an analog to digital converter (ADC) 106, prior to the digitized input RF signal being coupled to a field programmable gate array (FPGA) 108. In some embodiments, the input RF signal is down converted to an intermediate frequency before being digitally converted via the ADC. The adaptive filter stage described above may be implemented within the FPGA 108, which has been programmed to contain a plurality of adaptive filter elements tunable to different operating frequencies and frequency bands, and at least some being adaptive from a bandpass to a bandstop configuration or vice versa, as desired. Adaptive filter control algorithms based on error performance can also be implemented in whole or in part within the FPGA 108. In the illustrative example, the FPGA 108 implementing the error performance filtering algorithm receives an error signal(s) (shown in phantom). The error signal(s) can be received from an error detector and/or corrector provided after a demodulator. It is also conceivable that one or more of the demodulation, error detection and/or correction can also be implemented in whole or in part within the FPGA 108, e.g., in combination with the DSP 110. Although an FPGA is illustrated, it will be readily understood that other architectures such as an application specific integrated circuit (ASIC) or a digital signal processor (DSP) may also be used to implement a digital filter architecture described in greater detail below.

A DSP 110 is coupled to the FPGA 108 and executes signal processing algorithms that may include a spectral blind source separation algorithm, a signal to interference noise ratio (SINR) output estimator, bidirectional transceiver data line operation for collaborative retuning of the adaptive filter stage in response to instructions from the tuner, and/or an optimal filter tuning coefficients algorithm.

FPGA 108 is also coupled to a PCI target 112 that interfaces the FPGA 108 and a PCI bus 114 for communicating data externally. A system clock 118 provides a clock input to the FPGA 108 and DSP 110, thereby synchronizing the components. The system clock 118 may be locally set on the adaptive front-end controller, while in other examples the system clock 118 may reflect an external master clock, such as that of a radio tuner. The FPGA 108, DSP 110, and PCI target 112, designated collectively as signal processing module 116, will be described in greater detail below. In the illustrated example, the adaptive front-end controller 100 includes a microcontroller 120 coupled to the PCI bus 114 and an operations, alarms and metrics (OA&M) processor 122. Although they are shown and described herein as separate devices that execute separate software instructions, those having ordinary skill in the art will readily appreciate that the functionality of the microcontroller 120 and the OA&M processor 122 may be merged into a single processing device. The microcontroller 120 and the OA&M processor 122 are coupled to external memories 124 and 126, respectively. The microcontroller 120 may include the ability to communicate with peripheral devices, and, as such, the microcontroller 120 may be coupled to a USB port, an Ethernet port, or an RS232 port, among others (though none shown). In operation, the microcontroller 120 may locally store lists of channels having interferers or a list of known typically available frequency spectrum bands, as well as various other parameters. Such a list may be transferred to a reporting and control facility or a base station, via the OA&M processor 122, and may be used for system diagnostic purposes.

The aforementioned diagnostic purposes may include, but are not limited to, controlling the adaptive front-end controller 100 to obtain particular information relating to an interferer and retasking the interferer. For example, the reporting and control facility may use the adaptive front-end controller 100 to determine the identity of an interferer, such as a mobile unit, by intercepting the electronic serial number (ESN) of the mobile unit, which is sent when the mobile unit transmits information on the narrowband channel. Knowing the identity of the interferer, the reporting and control facility may contact infrastructure that is communicating with the mobile unit (e.g., the base station) and may request the infrastructure to change the transmit frequency for the mobile unit (i.e., the frequency of the narrowband channel on which the mobile unit is transmitting) or may request the infrastructure to drop communications with the interfering mobile unit altogether.

Additionally, in a cellular configuration (e.g., a system based on a configuration like that of FIG. 1) diagnostic purposes may include using the adaptive front-end controller 100 to determine a telephone number that the mobile unit is attempting to contact and, optionally handling the call. For example, the reporting and control facility may use the adaptive front-end controller 100 to determine that the user of the mobile unit was dialing 911, or any other emergency number, and may, therefore, decide that the adaptive front-end controller 100 should be used to handle the emergency call by routing the output of the adaptive front-end controller 100 to a telephone network.

The FPGA 108 can provide a digital output coupled to a digital to analog converter (DAC) 128 that converts the digital signal to an analog signal which may be provided to a filter 130 to generate a filtered RF output to be broadcast from the base station or mobile station. The digital output at the FPGA 108, as described, may be one of many possible outputs. For example, the FPGA 108 may be configured to output signals based on a predefined protocol such as a Gigabit Ethernet output, an open base station architecture initiative (OBSAI) protocol, or a common public radio interface (CPRI) protocol, among others.

It is further noted that the aforementioned diagnostic purposes may also include creating a database of known interferers, the time of occurrence of the interferers, the frequency of occurrence of the interferers, spectral information relating to the interferers, a severity analysis of the interferers, and so on. The identity of the interferers may be based solely on spectral profiles of each interferer that can be used for identification purposes. Although the aforementioned illustrations describe a mobile unit 12 as an interferer, other sources of interference are possible. Any electronic appliance that generates electromagnetic waves such as, for example, a computer, a set-top box, a child monitor, a wireless access point (e.g., WiFi, ZigBee, Bluetooth, etc.) can be a source of interference. In one embodiment, a database of electronic appliances can be analyzed in a laboratory setting or other suitable testing environment to determine an interference profile for each appliance. The interference profiles can be stored in a database according to an appliance type, manufacturer, model number, and other parameters that may be useful in identifying an interferer. Spectral profiles provided by, for example, the OA&M processor 122 to a diagnostic system can be compared to a database of previously characterized interferers to determine the identity of the interference when a match is detected.

A diagnostic system, whether operating locally at the adaptive front end controller, or remotely at a base station, switching station, or server system, can determine the location of the interferer near the base station (or mobile unit) making the detection, or if a more precise location is required, the diagnostic system can instruct several base stations (or mobile units) to perform triangulation analysis to more precisely locate the source of the interference if the interference is frequent and measurable from several vantage points. With location data, interference identity, timing and frequency of occurrence, the diagnostic system can generate temporal and geographic reports showing interferers providing field personnel a means to assess the volume of interference, its impact on network performance, and it may provide sufficient information to mitigate interference by means other than filtering, such as, for example, interference avoidance by way of antenna steering at the base station, beam steering, retasking an interferer when possible, and so on.

Figure 8:
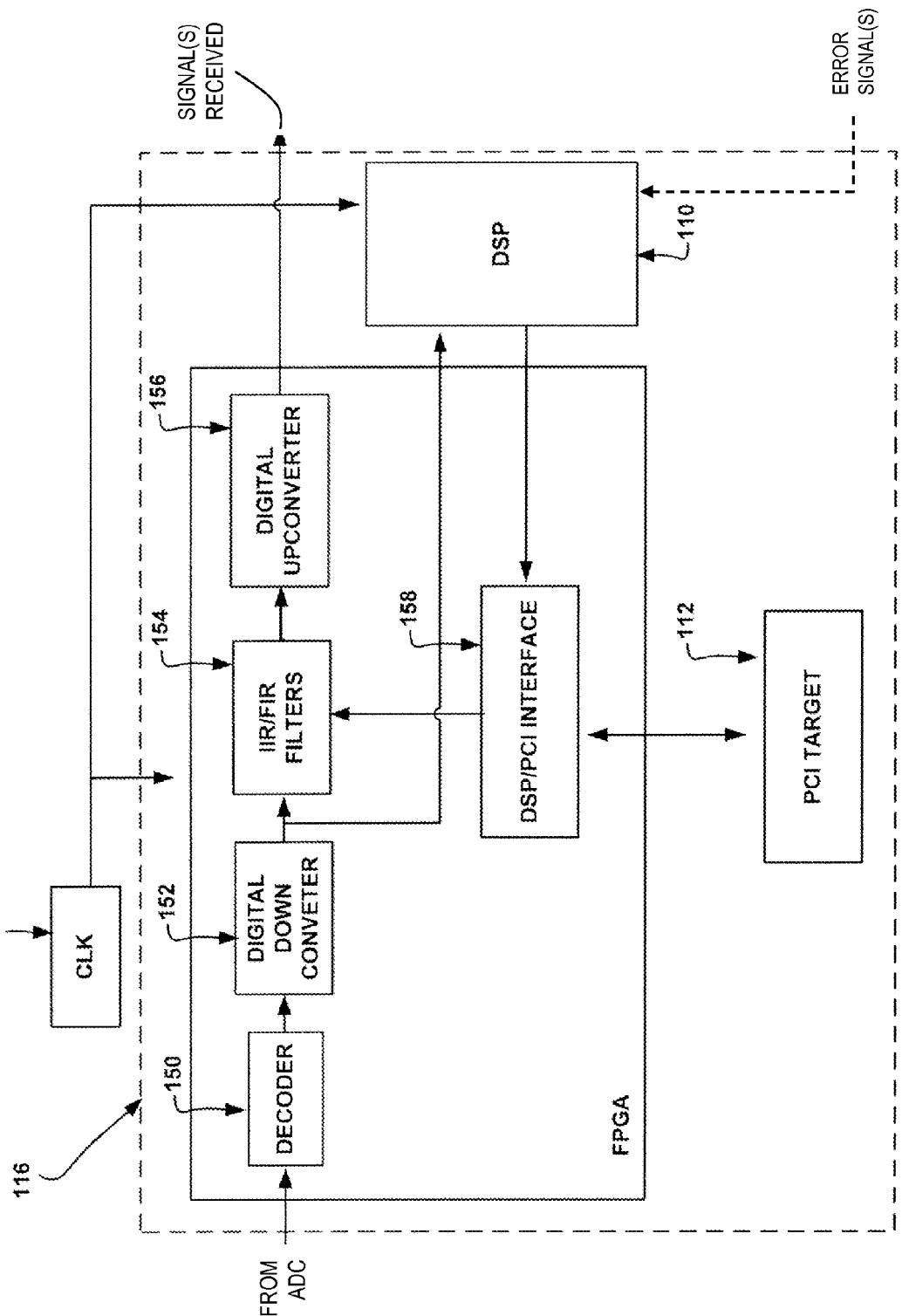
FIG. 8 depicts an illustrative embodiment of signal processing module of FIG. 7.

FIG. 8 illustrates further details of an example implementation of a signal processing module 116 that may serve as another embodiment of an adaptive front end controller, it being understood that other architectures may be used to implement a signal detection algorithm. A decoder 150 receives an input from the ADC 106 and decodes the incoming data into a format suitable to be processed by the signal processing module 116. A digital down converter 152, such as a polyphase decimator, down converts the decoded signal from the decoder 150. The decoded signal can be separated during the digital down conversion stage into a complex representation of the input signal, that is, into In-Phase (I) and Quadrature-Phase (Q) components which are then fed into one or more tunable elements, such as an infinite impulse response (IIR) and/or finite impulse response (FIR) filter 154. The IIR/FIR filter 154 may be implemented as multiple cascaded or parallel IIR and FIR filters. For example, the IIR/FIR filter 154 may be used with multiple filters in series, such as initial adaptive bandpass filter followed by adaptive bandstop filter. For example, the bandpass filters may be implemented as FIR filters, while the bandstop filters may be implemented as IIR filters. In an embodiment, fifteen cascaded tunable IIR/FIR filters are used to optimize the bit width of each filter. Of course other digital down converters and filters such as cascaded integrator-comb (CIC) filters may be used, to name a few. By using complex filtering techniques, such as the technique described herein, the sampling rate is lowered thereby increasing (e.g., doubling) the bandwidth that the filter 154 can handle. In addition, using complex arithmetic also provides the signal processing module 116 the ability to perform higher orders of filtering with greater accuracy.

The I and Q components from the digital down converter 152 are provided to the DSP 110 which implements a detection algorithm and in response provides the tunable IIR/FIR filter 154 with tuning coefficient data that tunes the IIR and/or FIR filters 154 to specific notch (or bandstop) and/or bandpass frequencies, respectively, and specific bandwidths. In some embodiments, the DSP 110 also receives one or more error signal(s), e.g., from an error detector and/or corrector processing demodulated information obtained from an signal processed by the signal processing module 116. The DSP 110 can determine independent tuning coefficient data and/or adjustments to pre-identified tuning coefficient data in response to the error signal(s). For example, an indication of errors occurring in a signal filtered according to the pre-identified tuning coefficient data can cause the DSP 110 to generate adjusted tuning coefficients to more aggressively filter an interfering signal. A more aggressive filter can include one or more of greater rejection, increased spectral width, and/or a different shape, such as having steeper sloped edges.

The tuning coefficient data, for example, may include a frequency and a bandwidth coefficient pair for each of the adaptive filters, which enables the filter to tune to a frequency for bandpass or bandstop operation and the bandwidth to be applied for that operation. The tuning coefficient data corresponding to a bandpass center frequency and bandwidth may be generated by the detection algorithm and passed to a tunable FIR filter within the IIR/FIR filter 154. The filter 154 may then pass all signals located within a passband of the given transmission frequency. Tuning coefficient data corresponding to a notch (or bandstop) filter may be generated by the detection algorithm and then applied to an IIR filter within the IIR/FIR filter 154 to remove any narrowband interference located within the passband of the bandpass filter. The tuning coefficient data generated by the detection algorithm are implemented by the tunable IIR/FIR filters 154 using mathematical techniques known in the art. In the case of a cognitive radio, upon implementation of the detection algorithm, the DSP 110 may determine and return coefficients corresponding to a specific frequency and bandwidth to be implemented by the tunable IIR/FIR filter 154 through a DSP/PCI interface 158. Similarly, the transfer function of a notch (or bandstop) filter may also be implemented by the tunable IIR/FIR filter 154. Of course other mathematical equations may be used to tune the IIR/FIR filters 154 to specific notch, bandstop, or bandpass frequencies and to a specific bandwidth.

After the I and Q components are filtered to the appropriate notch (or bandstop) or bandpass frequency at a given bandwidth, a digital upconverter 156, such as a polyphase interpolator, converts the signal back to the original data rate, and the output of the digital upconverter is provided to the DAC 128.

A wireless communication device capable to be operated as a dual- or tri-band device communicating over multiple standards, such as over GSM and UMTS may use the adaptive digital filter architecture embodiments as described above. For example, a dual-band device (using both UMTS and GSM) may be preprogrammed within the DSP 110 to transmit first on UMTS, if available, and on GSM only when outside of a UMTS network. In such a case, the IIR/FIR filter 154 may receive tuning coefficient data from the DSP 110 to pass all signals within a UMTS range. That is, the tuning coefficient data may correspond to a bandpass center frequency and bandwidth adapted to pass only signals within the UMTS range. The signals corresponding to a GSM signal may be filtered, and any interference caused by the GSM signal may be filtered using tuning coefficients, received from the DSP 110, corresponding to a notch (or bandstop) frequency and bandwidth associated with the GSM interference signal.

Alternatively, in some cases it may be desirable to keep the GSM signal in case the UMTS signal fades quickly and the wireless communication device may need to switch communication standards rapidly. In such a case, the GSM signal may be separated from the UMTS signal, and both passed by the adaptive front-end controller. Using the adaptive digital filter, two outputs may be realized, one output corresponding to the UMTS signal and one output corresponding to a GSM signal. The DSP 110 may be programmed to again recognize the multiple standard service and may generate tuning coefficients corresponding to realize a filter, such as a notch (or bandstop) filter, to separate the UMTS signal from the GSM signal. In such examples, an FPGA may be programmed to have parallel adaptive filter stages, one for each communication band.

To implement the adaptive filter stages, in some examples, the signal processing module 116 is pre-programmed with general filter architecture code at the time of production, for example, with parameters defining various filter types and operation. The adaptive filter stages may then be programmed, through a user interface or other means, by the service providers, device manufactures, etc., to form the actual filter architecture (parallel filter stages, cascaded filter stages, etc.) for the particular device and for the particular network(s) under which the device is to be used. Dynamic flexibility can be achieved during runtime, where the filters may be programmed to different frequencies and bandwidths, each cycle, as discussed herein.

One method of detecting a wideband signal having narrowband interference is by exploiting the noise like characteristics of a signal. Due to such noise like characteristics of the signal, a particular measurement of a narrowband channel power gives no predictive power as to what the next measurement of the same measurement channel may be. In other words, consecutive observations of power in a given narrowband channel are un-correlated. As a result, if a given measurement of power in a narrowband channel provides predictive power over subsequent measurements of power in that particular channel, thus indicating a departure from statistics expected of a narrowband channel without interference, such a narrowband channel may be determined to contain interference.

Figure 9:
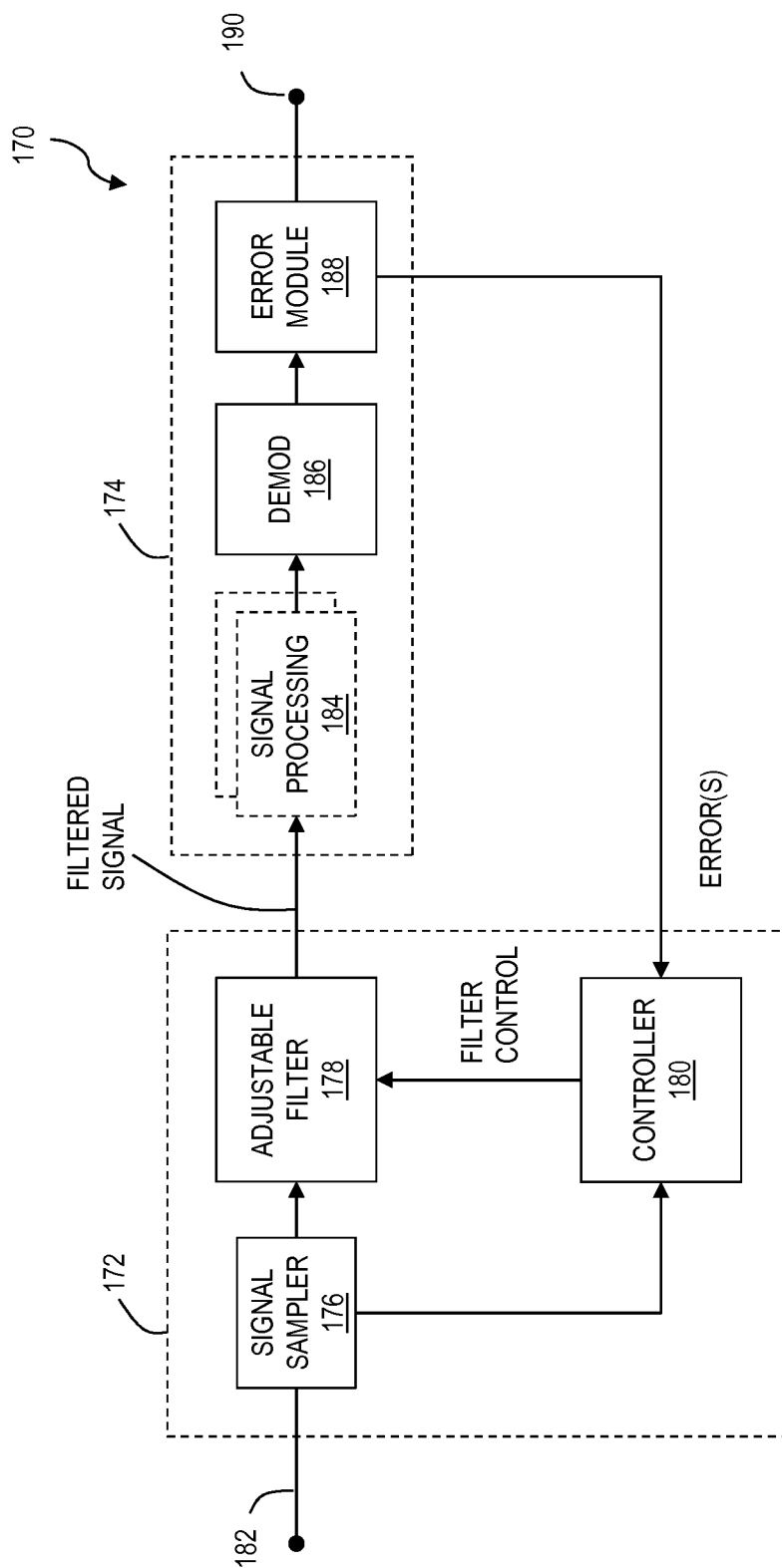
FIG. 9 depicts an illustrative embodiment of a portion of a communication system.

FIG. 9 illustrates an example of a portion of a communication system 170, comprising an adaptive front end 172 and a wideband receiver 174. The adaptive front end 172 includes a signal sampler 176, an adjustable filter 178 and a controller 180. An input of the signal sampler 176 is coupled to an input terminal 182 to receive an information bearing signal comprises a modulated carrier waveform. An output of the signal sampler 176 is coupled to an input of the adjustable filter 178. A sampling output of the signal sampler 176 is coupled to a first input of the controller 180. An output of the adjustable filter 178 is coupled to an input of the wideband receiver 174.

The wideband receiver 174 includes one or more signal processing modules 184, a demodulator 186 and an error module 188. An output of the adjustable filter 178 is coupled to an input of the one or more signal processing modules 184. An output of the signal processing module(s) 184 is coupled to an input of the demodulator 186, and an output of the demodulator 186 is coupled to an input of the error module 188. The error module 188 has a first output coupled to an output port of the communication system 170.

In operation, the information bearing signal is received at the input terminal 182. The received signal has a frequency content that spans a signal spectrum, such as the spectra illustrated in FIGS. 2 and 3. At least a portion of the received signal is directed to an input of the controller 180. The controller 180 operates according to the techniques disclosed herein to identify one or more likely sources of interference within the signal spectrum of the received signal. The controller 180 determines a mitigation state, e.g., a filter state, responsive to the interference. For example, a determination that a first interferer is located within a first frequency range $FR_1$ causes the controller to determine coefficients for a filter, such as a notch or band-reject filter, also operating within a frequency region including at least a portion of the first frequency range $FR_1$.

The controller 180 provides a filter control signal to a control input of the adjustable filter 178. For example, the controller 180 sends the filter coefficients to the adjustable filter 178. The adjustable filter, in turn, adjusts the adjustable filter according to the filter coefficients, resulting in a filter profile, e.g., a notch, to mitigate the detected interference. A filtered rendition of the information bearing signal is provided as an input to the wide band receiver 174.

The signal processing 184 module(s) can include one or more of up-converters, down-converters, filters, amplifiers, attenuators, multiplexers, de-multiplexers, encryptors, decryptors, encoders, decoders, and the like, as may be suitable for providing a signal processed rendition of the filtered information signal is presented to an input of the demodulator 186. The demodulator demodulates the signal processed signal to obtain intelligible information from the information bearing signal. The error detection and/or correction module 188 determines error(s) in the demodulated information, e.g., bit stream, packets, blocks. A signal related to the error(s) is received at the controller 180 from the error module 188. The controller determines whether a filter setting of the adjustable filter 178 used in filtering the signal resulting in the demodulated information should be adjusted. For example, an error signal indicating an error or number of errors can cause the controller to adjust the filter state, e.g., by adjusting the filter coefficients to modify a transfer function of the filter. The process can be repeated periodically, e.g., by adjusting for some portions of a bit stream, or a subset of packets.

The adjustable filter can be an analog filter, e.g., having one or more lumped circuit elements (e.g., resistors, inductors, capacitors), transmission line components, waveguide components, and the like, wherein at least some of the elements are adjustable. Alternatively or in addition, the adjustable filter can be a digital filter, e.g., having one or more taps, each adjustable by way of a respective coefficient. Through adjustment in a systematic manner, a desired filtered transfer function can be obtained for either class of filters.

Likewise, the signal processing module(s) 184 can include analog elements, such as lumped circuit elements, transmission line components, waveguide components, surface acoustic wave components, and other active elements, such as semiconductor devices, transistors, and/or diodes. Some example of active elements include mixers, amplifiers and signal conditioners. The signal sampler 176 can be a simple wire junction, or a transmission line or waveguide device including a sample port providing at least a portion of the signal present at its input port. One or more of the devices, such as the adjustable filter, the controller 180, the signal processing module(s) 184, the demodulator 186 and the error module 188 can be implemented in hardware, firmware, software or a combination thereof. Implementations of one or more of these devices can be in DSP, FPGAs and the like.

In the illustrative example, the mitigation state corresponds to a filter state usable to adjust an interference filter. It is understood that more generally, the mitigation state can include one or more system parameters usable to avoid or otherwise mitigate interference. By way of illustrative example, and without limitation, such system parameters can include other signal processing parameters, such as gain and/or attenuation settings, e.g., in a receiver. Alternatively or in addition, such mitigation parameters can include system parameters adjustable to avoid interference. Such system parameters can include, without limitation, re-assigning a frequency of one or more of a received signal and a corresponding transmitter signal, e.g., tuning one or both to another portion of the frequency spectrum. Such system parameters can also include re-assigning a frequency of one or more perceived sources of interference, modulation and/or filtering of such sources. Still other system parameters can include modulation and/or coding, e.g., FEC coding. Consider a signal being received without FEC coding, or with a "light" coding using some number of redundant bits. Upon detection of interference, an adjusted mitigation state applies FEC coding where it previously was not applied, or applies a "stronger" code, e.g., using a greater number of redundant bits. A mitigation state can include one or more of any of the interference avoidance techniques disclosed herein, including any of the interference control and/or avoidance techniques disclosed in each of the commonly owned, co-pending U.S. patent application Ser. No. 12/66,935, entitled "Method and Apparatus for Avoiding Interference"; Ser. No. 13/26, 198, entitled "Method and Apparatus for Signal Interference Processing," and Ser. No. 13/26,207, entitled "Method and Apparatus for Signal Interference Processing," each incorporated herein by reference in its entirety.

Figure 10:
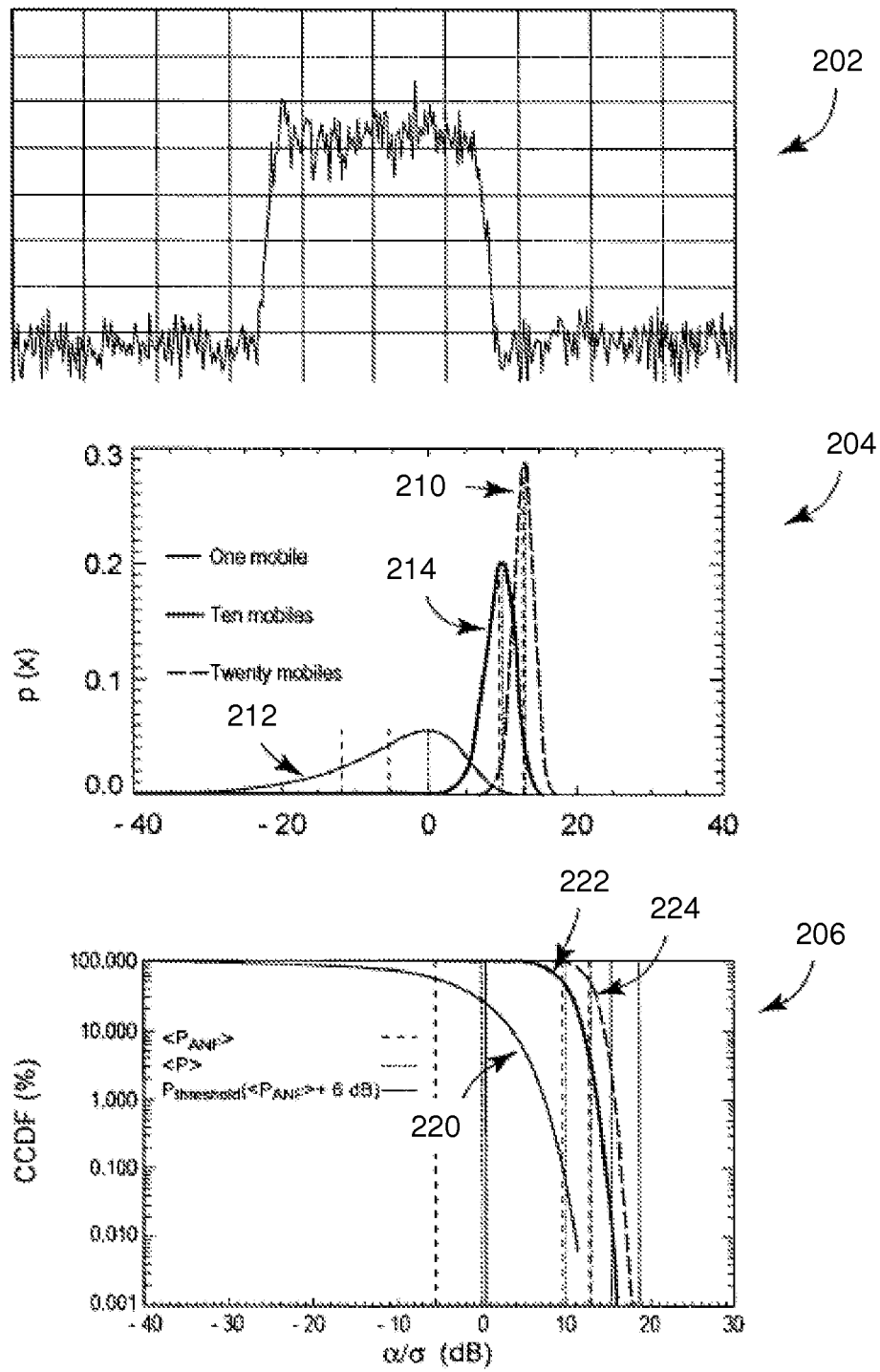
FIG. 10 depicts an illustrative embodiment of plots of a spread spectrum signal.

FIG. 10 illustrates an IS-95 CDMA signal 202, which is a generic Direct Sequence Spread Spectrum (DSSS) signal. The CDMA signal 202 may have a bandwidth of 1.2288 MHz and it may be used to carry up to 41 narrowband channels, each of which has a bandwidth of 30 kHz. One way to identify interference affecting the CDMA signal 202 may be to identify any of such 41 narrowband channels having excess power above an expected power of the CDMA signal 202. FIG. 10 also illustrates the probability distribution functions (PDFs) 204 of a typical DSSS signal and a complementary cumulative distribution functions (CCDFs) 206 of a typical DSSS signal, which may be used to establish a criteria used to determine narrowband channels disposed within a wideband signal and having excess power.

Specifically, the PDFs 204 include probability distribution of power in a given channel, which is the likelihood p(x) of measuring a power x in a given channel, for a DSSS signal carrying one mobile unit (212), for a DSSS signal carrying ten mobile units (214), and for a DSSS signal carrying twenty mobile units (210). For example, for the PDF 212, representing a DSSS signal carrying one mobile unit, the distribution p(x) is observed to be asymmetric, with an abbreviated high power tail. In this case, any channel having power higher than the high power tail of the PDF 212 may be considered to have an interference signal.

The CCDFs 206 denote the likelihood that a power measurement in a channel will exceed a given mean power a, by some value $\alpha/\sigma$, wherein $\sigma$ is standard deviation of the power distribution. Specifically, the CCDFs 206 include an instance of CCDF for a DSSS signal carrying one mobile unit (220), an instance of CCDF for a DSSS signal carrying ten mobile units (222), and an instance of CCDF for a DSSS signal carrying twenty mobile units (224). Thus, for example, for a DSSS signal carrying one mobile unit, the likelihood of any narrowband channel having the ratio $\alpha/\sigma$ of 10 dB or more is 0.01%. Therefore, an optimal filter can be tuned to such a narrowband channel having excess power.

One method of detecting such a narrowband channel having interference is by exploiting the noise like characteristic of a DSSS signal. Due to such noise like characteristic of DSSS signal, a particular measurement of a narrowband channel power gives no predictive power as to what the next measurement of the same measurement channel may be. In other words, consecutive observations of power in a given narrowband channels are un-correlated. As a result, if a given measurement of power in a narrowband channel provides predictive power over subsequent measurements of power in that particular channel, thus indicating a departure from statistics expected of a narrowband channel without interference, such a narrowband channel may be determined to contain interference.

Figure 11:
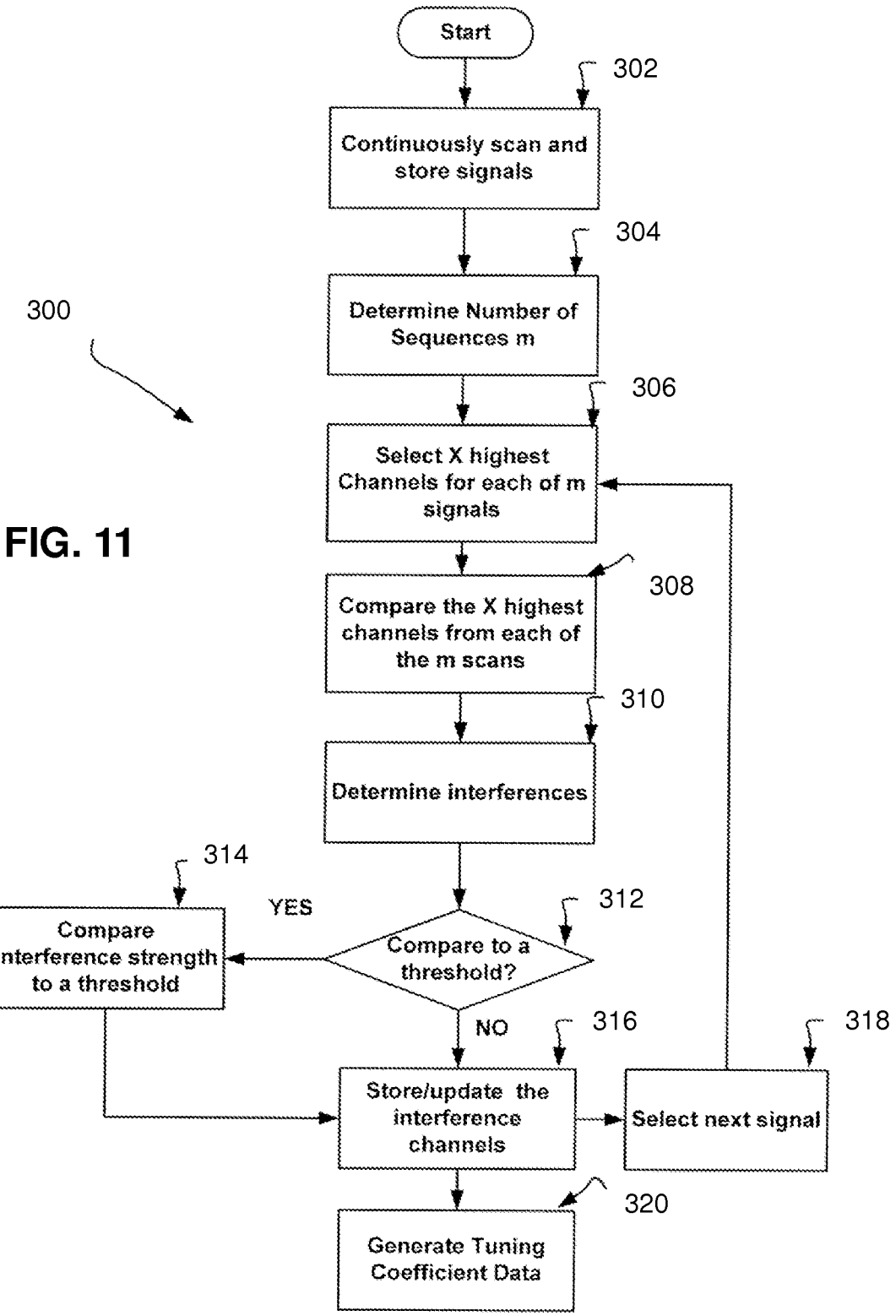
FIG. 11 depicts an illustrative embodiment of a method for interference detection.

FIG. 11 illustrates a flowchart of an interference detection program 300 that may be used to determine location of interference in a DSSS signal. At block 302 a series of DSSS signals can be scanned by the adaptive front end controller described above and the observed values of the signal strengths can be stored for each of various narrowband channels located in the DSSS signal. For example, at block 302 the adaptive front end controller may continuously scan the 1.2288 MHz DSSS signal 60 for each of the 41 narrowband channels dispersed within it. The adaptive front end controller may be implemented by any well-known analog scanner or digital signal processor (DSP) used to scan and store signal strengths in a DSSS signal. The scanned values of narrowband signal strengths may be stored in a memory of such DSP or in any other computer readable memory. The adaptive front end controller may store the signal strength of a particular narrowband channel along with any information, such as a numeric identifier, identifying the location of that particular narrowband channel within the DSSS signal.

At block 304 the adaptive front end controller can determine the number of sequences m of a DSSS signal that may be required to be analyzed to determine narrowband channels having interference. A user may provide such a number m based on any pre-determined criteria. For example, a user may provide m to be equal to four, meaning that four consecutive DSSS signals need to be analyzed to determine if any of the narrowband channels within that DSSS signal spectrum includes an interference signal. As one of ordinary skill in the art would appreciate, the higher is the selected value of m, the more accurate will be the interference detection. However, the higher the number m is, the higher is the delay in determining whether a particular DSSS signal had an interference present in it, subsequently, resulting in a longer delay before a filter is applied to the DSSS signal to remove the interference signal.

Generally, detection of an interference signal may be performed on a rolling basis. That is, at any point in time, m previous DSSS signals may be used to analyze presence of an interference signal. The earliest of such m interference signals may be removed from the set of DSSS signals used to determine the presence of an interference signal on a first-in-first-out basis. However, in an alternate embodiment, an alternate sampling method for the set of DSSS signals may also be used.

At block 306 the adaptive front end controller can select x narrowband channels having the highest signal strength from each of the m most recent DSSS signals scanned at the block 302. The number x may be determined by a user. For example, if x is selected to be equal to three, the block 306 may select three highest channels from each of the m most recent DSSS signals. The methodology for selecting x narrowband channels having highest signal strength from a DSSS signal is described in further detail in FIG. 12 below. For example, the adaptive front end controller at block 306 may determine that the first of the m DSSS signals has narrowband channels 10, 15 and 27 having the highest signal strengths, the second of the m DSSS channels has narrowband channels 15 and 27 and 35 having the highest signal strengths, and the third of the m DSSS channels has the narrowband channels 15, 27 and 35 having the highest narrowband signal strength.

After having determined the x narrowband channels having the highest signal strengths in each of the m DSSS signals, at block 308 the adaptive front end controller can compare these x narrowband channels to determine if any of these highest strength narrowband channels appear more than once in the m DSSS signals. In case of the example above, the adaptive front end controller at block 308 may determine that the narrowband channels 15 and 27 are present among the highest strength narrowband channels for each of the last three DSSS signals, while channel 35 is present among the highest strength narrowband channels for at least two of the last three DSSS signals.

Such consistent appearance of narrowband channels having highest signal strength over subsequent DSSS signals indicate that narrowband channels 15 and 27, and probably the narrowband channel 35, may have an interference signal super-imposed on them. At block 310 the adaptive front end controller may use such information to determine which narrowband channels may have interference. For example, based on the number of times a given narrowband channel appears in the selected highest signal strength channels, the adaptive front end controller at block 310 may determine the confidence level that may be assigned to a conclusion that a given narrowband channel contains an interference signal.

Alternatively, at block 310 the adaptive front end controller may determine a correlation factor for each of the various narrowband channels appearing in the x selected highest signal strength channels and compare the calculated correlation factors with a threshold correlation factor to determine whether any of the x selected channels has correlated signal strengths. Calculating a correlation factor based on a series of observations is well known to those of ordinary skill in the art and therefore is not illustrated in further detail herein. The threshold correlation factor may be given by the user of the interference detection program 300.

Note that while in the above illustrated embodiment, the correlation factors of only the selected highest signal strength channels are calculated, in an alternate embodiment, correlation factors of all the narrowband channels within the DSSS signals may be calculated and compared to the threshold correlation factor.

Empirically, it may be shown that when m is selected to be equal to three, for a clean DSSS signal, the likelihood of having at least one match among the higher signal strength narrowband channels is 0.198, the likelihood of having at least two matches among the higher signal strength narrowband channels is 0.0106, and the likelihood of having at least three matches among the higher signal strength narrowband channels is $9.38 \times 10^{-5}$. Thus, the higher the number of matches, the lesser is the likelihood of having a determination that one of the x channels contains an interference signal (i.e., a false positive interference detection). It may be shown that if the number of scans m is increased to, say four DSSS scans, the likelihood of having such matches in m consecutive scans is even smaller, thus providing higher confidence that if such matches are found to be present, they indicate presence of interference signal in those narrowband channels.

To identify the presence of interference signals with even higher level of confidence, at block 312 the adaptive front end controller may decide whether to compare the signal strengths of the narrowband channels determined to have an interference signal with a threshold. If at block 312 the adaptive front end controller decides to perform such a comparison, at block 314 the adaptive front end controller may compare the signal strength of each of the narrowband channels determined to have an interference with a threshold level. Such comparing of the narrowband channel signal strengths with a threshold may provide added confidence regarding the narrowband channel having an interference signal so that when a filter is configured according to the narrowband channel, the probability of removing a non-interfering signal is reduced. However, a user may determine that such added confidence level is not necessary and thus no such comparison to a threshold needs to be performed. In which case, at block 316 the adaptive front end controller stores the interference signals in a memory.

After storing the information about the narrowband channels having interference signals, at block 318 the adaptive front end controller selects the next DSSS signal from the signals scanned and stored at block 302. At block 318 the adaptive front end controller may cause the first of the m DSSS signals to be dropped and the newly added DSSS signal is added to the set of m DSSS signals that will be used to determine presence of an interference signal (first-in-first-out). Subsequently, at block 306 the process of determining narrowband channels having interference signals is repeated by the adaptive front end controller. Finally, at block 320 the adaptive front end controller may select and activate one or more filters that are located in the path of the DSSS signal to filter out any narrowband channel identified as having narrowband interference in it.

Figure 12:
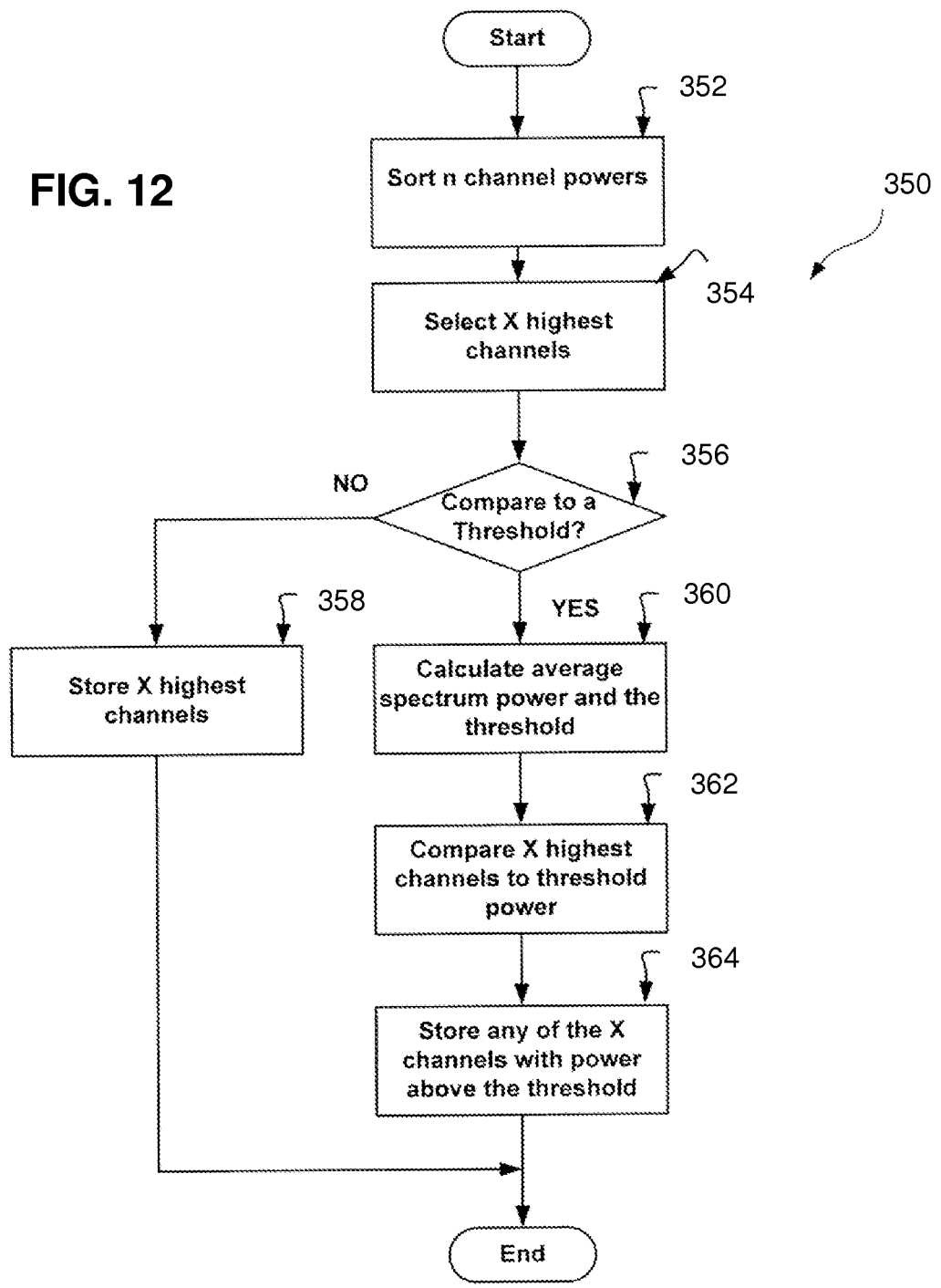
FIG. 12 depicts illustrative embodiments of the method of FIG. 11.

Now referring to FIG. 12, a flowchart illustrates a high strength channels detection program 350 that may be used to identify various channels within a given scan of the DSSS signal that may contain an interference signal. The high strength channels detection program 350 may be used to implement the functions performed at block 306 of the interference detection program 300. In a manner similar to the interference detection program 300, the high strength channels detection program 350 may also be implemented using software, hardware, firmware or any combination thereof.

At block 352 the adaptive front end controller may sort signal strengths of each of the n channels within a given DSSS signal. For example, if a DSSS signal has 41 narrowband channels, at block 352 the adaptive front end controller may sort each of the 41 narrowband channels according to its signal strengths. Subsequently, at block 354 the adaptive front end controller may select the x highest strength channels from the sorted narrowband channels and store information identifying the selected x highest strength channels for further processing. An embodiment of the high strength channels detection program 350 may simply use the selected x highest strength channels from each scan of the DSSS signals to determine any presence of interference in the DSSS signals. However, in an alternate embodiment, additional selected criteria may be used.

Subsequently, at block 356 the adaptive front end controller can determine if it is necessary to compare the signal strengths of the x highest strength narrowband channels to any other signal strength value, such as a threshold signal strength, etc., where such a threshold may be determined using the average signal strength across the DSSS signal. For example, at block 356 the adaptive front end controller may use a criterion such as, for example: "when x is selected to be four, if at least three out of four of the selected narrowband channels have also appeared in previous DSSS signals, no further comparison in necessary." Another criterion may be, for example: "if any of the selected narrowband channels is located at the fringe of the DSSS signal, the signal strengths of such narrowband channels should be compared to a threshold signal strength." Other alternate criteria may also be provided.

If at block 356 the adaptive front end controller determines that no further comparison of the signal strengths of the selected x narrowband channels is necessary, at block 358 the adaptive front end controller stores information about the selected x narrowband channels in a memory for further processing. If at block 356 the adaptive front end controller determines that it is necessary to apply further selection criteria to the selected x narrowband channels, the adaptive front end controller returns to block 360. At block 360 the adaptive front end controller may determine a threshold value against which the signal strengths of each of the x narrowband channels are compared based on a predetermined methodology.

For example, in an embodiment, at block 360 the adaptive front end controller may determine the threshold based on the average signal strength of the DSSS signal. The threshold signal strength may be the average signal strength of the DSSS signal or a predetermined value may be added to such average DSSS signal to derive the threshold signal strength.

Subsequently, at block 362 the adaptive front end controller may compare the signal strengths of the selected x narrowband channels to the threshold value determined at block 360. Only the narrowband channels having signal strengths higher than the selected threshold are used in determining presence of interference in the DSSS signal. Finally, at block 364 the adaptive front end controller may store information about the selected x narrowband channels having signal strengths higher than the selected threshold in a memory. As discussed above, the interference detection program 300 may use such information about the selected narrowband channels to determine the presence of interference signal in the DSSS signal.

The interference detection program 300 and the high strength channel detection program 350 may be implemented by using software, hardware, firmware or any combination thereof. For example, such programs may be stored on a memory of a computer that is used to control activation and deactivation of one or more notch filters. Alternatively, such programs may be implemented using a digital signal processor (DSP) which determines the presence and location of interference channels in a dynamic fashion and activates/deactivates one or more filters.

Figure 13:
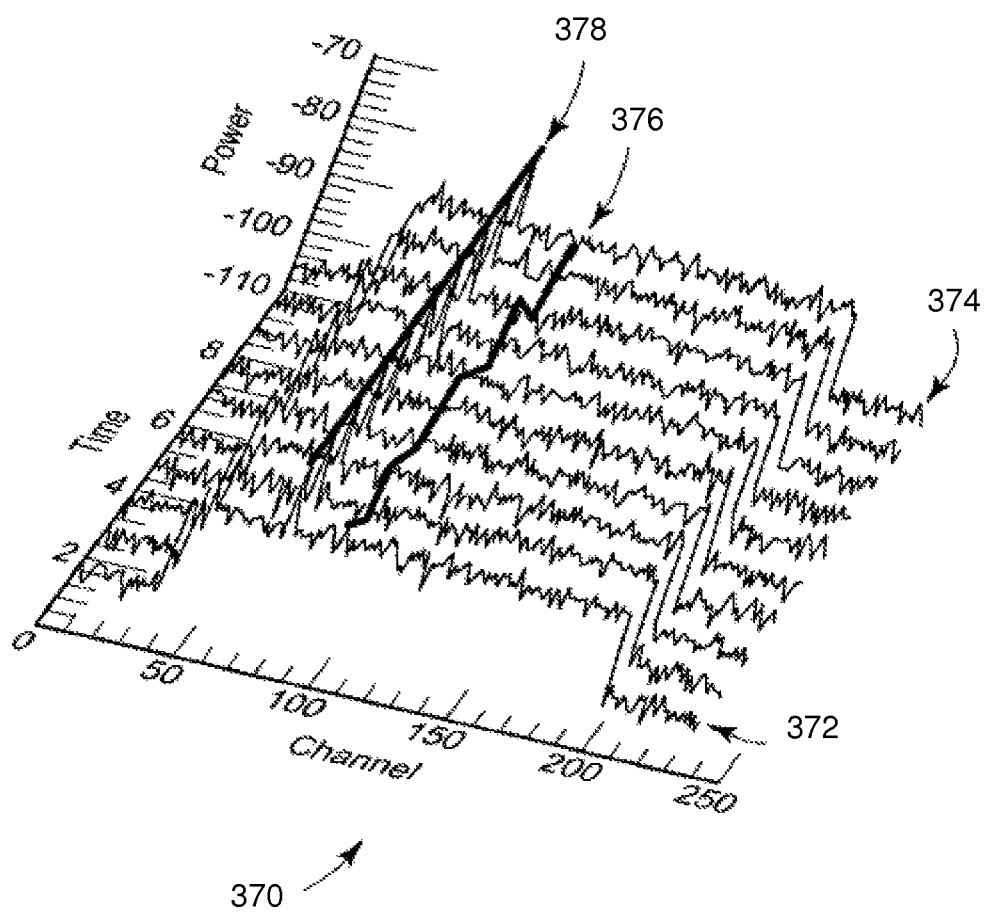
FIG. 13 depicts illustrative embodiments of a series of spread spectrum signals intermixed with an interference signal.

FIG. 13 illustrates a three dimensional graph 370 depicting several DSSS signals 372-374 over a time period. A first axis of the graph 370 illustrates the number of narrowband channels of the DSSS signals 372-374, a second axis illustrates time over which a number of DSSS signals 372-374 are scanned, and a third axis illustrates the power of each of the narrowband channels. The DSSS signals 372-374 are shown to be affected by an interference signal 378.

The interference detection program 370 may start scanning various DSSS signals 372-374 starting from the first DSSS signal 372. As discussed above at block 304 the adaptive front end controller determines the number m of the DSSS signals 372-374 that are to be scanned. Because the interference signal 378 causes the signal strength of a particular narrowband channel to be consistently higher than the other channels for a number of consecutive scans of the DSSS signals 372- 374 at block 210 the adaptive front end controller identifies a particular channel having an interference signal present. Subsequently, at block 320 the adaptive front end controller will select and activate a filter that applies the filter function as described above, to the narrowband channel having interference.

The graph 370 also illustrates the average signal strengths of each of the DSSS signals 372-374 by a line 376. As discussed above, at block 362 the adaptive front end controller may compare the signal strengths of each of the x selected narrowband channels from the DSSS signals 372-374 with the average signal strength, as denoted by line 376, in that particular DSSS signal.

Figure 14:
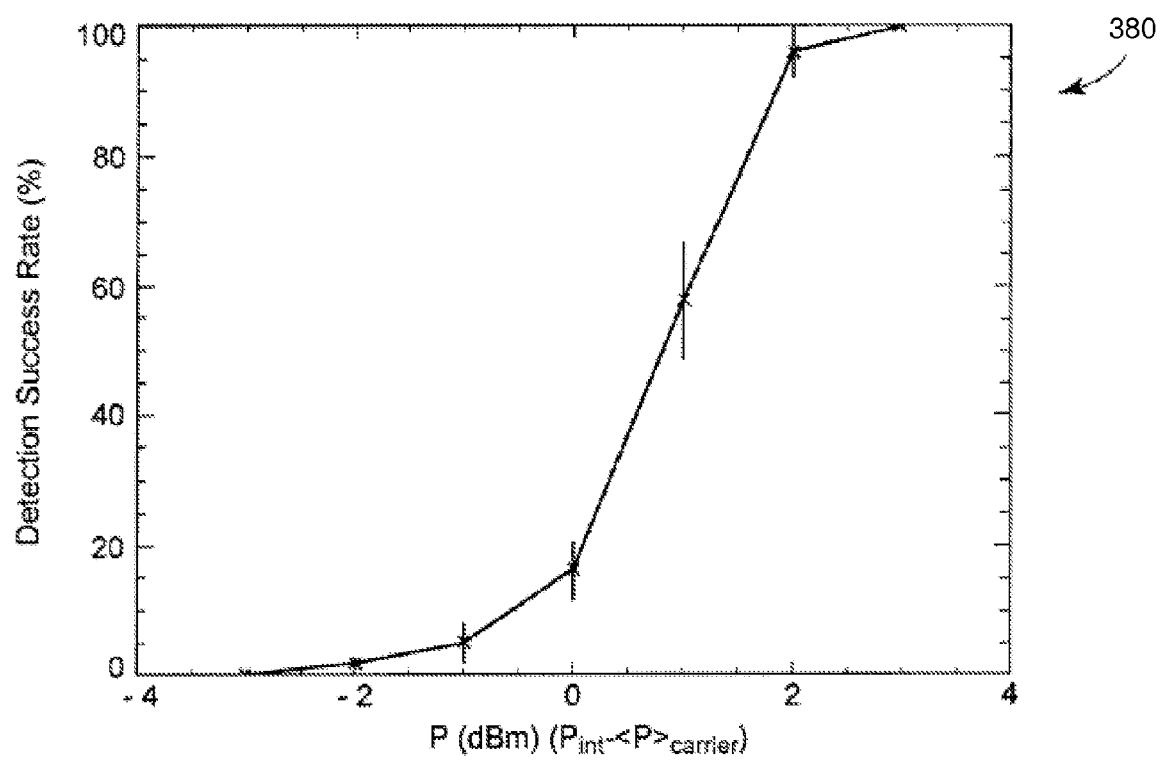
FIG. 14 depicts an illustrative embodiment of a graph depicting interference detection efficiency of a system of the subject disclosure.

Now referring to FIG. 14, a graph 380 illustrates interference detection success rate of using the interference detection program 370, as a function of strength of an interference signal affecting a DSSS signal. The x-axis of the graph 380 depicts the strength of interference signal relative to the strength of the DSSS signal, while the y-axis depicts the detection success rate in percentages. As illustrated, when an interference signal has a strength of at least 2 dB higher than the strength of the DSSS signal, such an interference signal is detected with at least ninety five percent success rate.

The foregoing interference detection and mitigation embodiments can further be adapted for detecting and mitigating interference in long-term evolution (LTE) communication systems.

Figure 15:
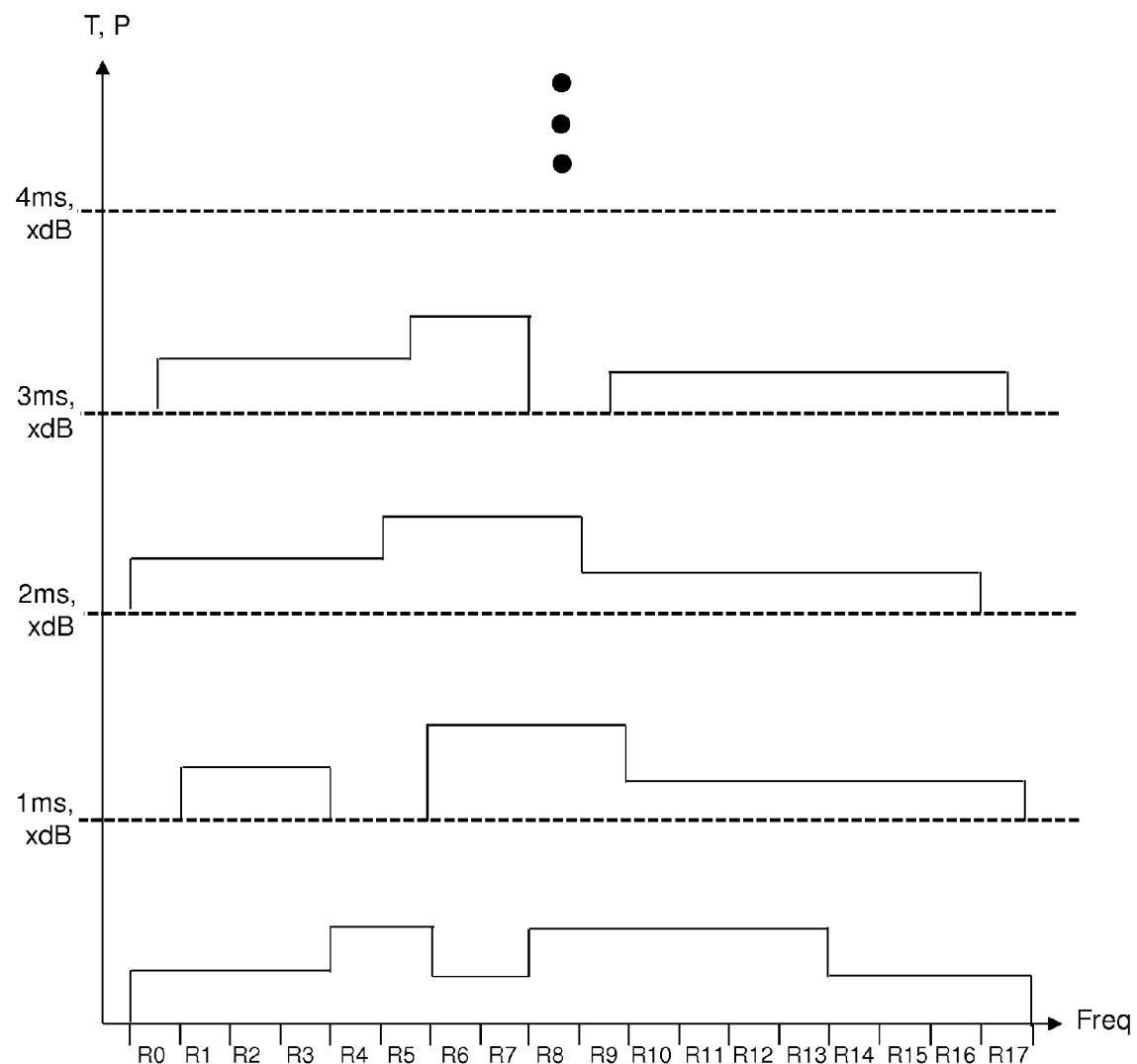
FIG. 15 depicts illustrative embodiments of Long Term Evolution (LTE) time and frequency signal plots.

LTE transmission consists of a combination of Resource Blocks (RB's) which have variable characteristics in frequency and time. A single RB can be assigned to a user equipment, specifically, a 180 KHz continuous spectrum utilized for 0.5-1 msec. An LTE band can be partitioned into a number of RBs which could be allocated to individual communication devices for specified periods of time for LTE transmission. Consequently, an LTE spectrum has an RF environment dynamically variable in frequency utilization over time. FIG. 15 depicts an illustrative LTE transmission.

LTE utilizes different media access methods for downlink (orthogonal frequency-division multiple access; generally, referred to as OFDMA) and uplink (single carrier frequency-division multiple access; generally, referred to as SC-FDMA). For downlink communications, each RB contains 12 sub-carriers with 15 KHz spacing. Each sub-carrier can be used to transmit individual bit information according to the OFDMA protocol. For uplink communications, LTE utilizes a similar RB structure with 12 sub-carriers, but in contrast to downlink, uplink data is pre-coded for spreading across 12 sub-carriers and is transmitted concurrently on all 12 sub-carriers.

The effect of data spreading across multiple sub-carriers yields a transmission with spectral characteristics similar to a CDMA/UMTS signal. Hence, similar principles of narrow band interference detection can be applied within an instance of SC-FDMA transmission from an individual communication device—described herein as user equipment (UE). However, since each transmission consists of unknown RB allocations with unknown durations, such a detection principle can only be applied separately for each individual RB within a frequency and specific time domain. If a particular RB is not used for LTE transmission at the time of detection, the RF spectrum will present a thermal noise which adheres to the characteristics of a spread spectrum signal, similar to a CDMA/UMTS signal.

Figure 16:
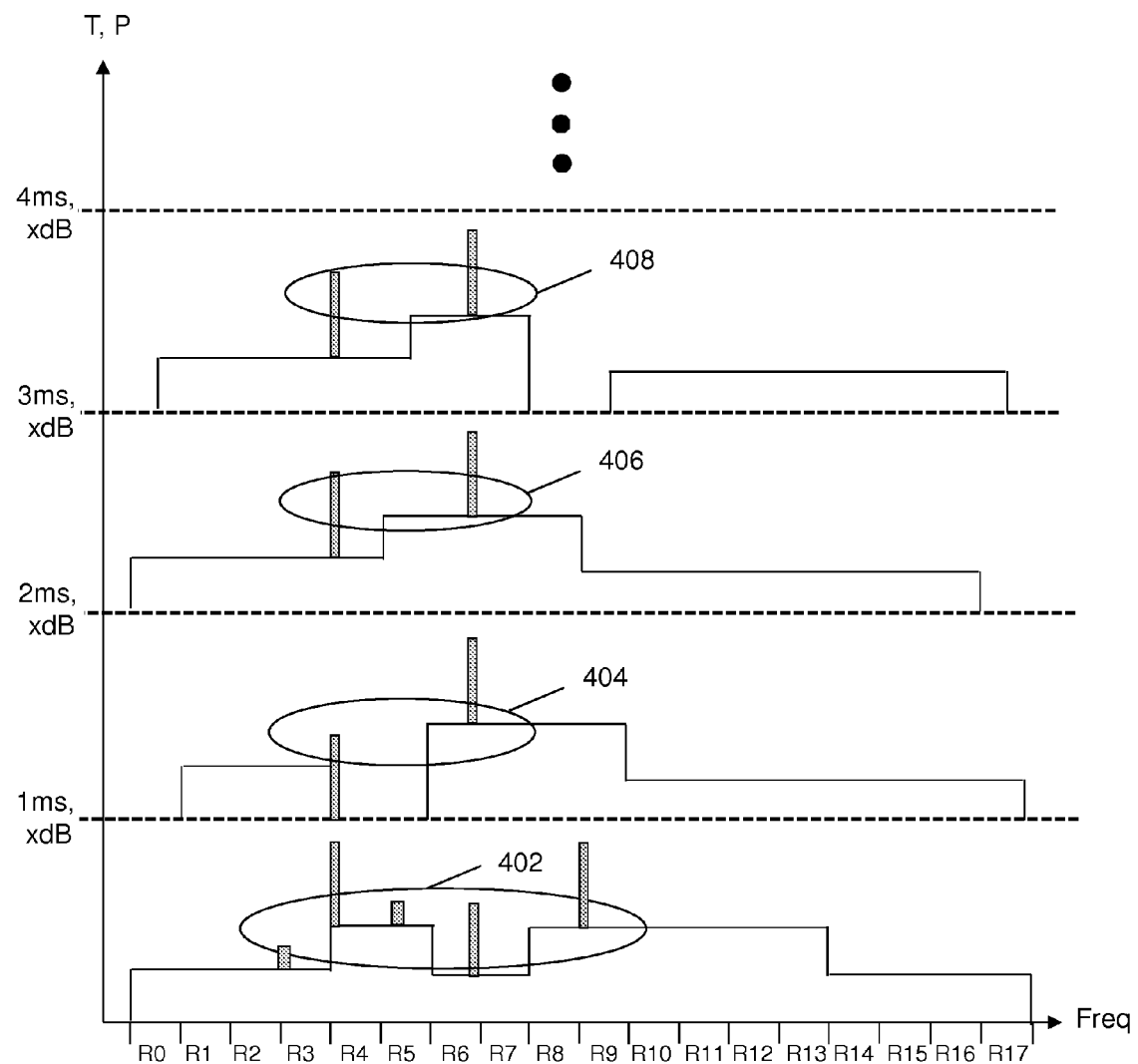
FIG. 16 depicts illustrative embodiments of LTE time and frequency signal plots intermixed with interference signals.

Co-channel, as well as other forms of interference, can cause performance degradation to SC-FDMA and OFDMA signals when present. FIG. 16 depicts an illustration of an LTE transmission affected by interferers 402, 404, 406 and 408 occurring at different points in time. Since such LTE transmissions do not typically have flat power spectral densities (see FIG. 15), identification of interference as shown in FIG. 16 can be a difficult technical problem. The subject disclosure, presents a method to improve the detection of narrowband interference in SC-FDMA/OFDM channels through a time-averaging algorithm that isolates interference components in the channel and ignores the underlying signal.

Time averaging system (TAS) can be achieved with a boxcar (rolling) average, in which the TAS is obtained as a linear average of a Q of previous spectrum samples, with Q being a user-settable parameter. The Q value determines the "strength" of the averaging, with higher Q value resulting in a TAS that is more strongly smoothed in time and less dependent on short duration transient signals. Due to the frequency-hopped characteristic of SC-FDMA/OFDMA signals, which are composed of short duration transients, the TAS of such signals is approximately flat. It will be appreciated that TAS can also be accomplished by other methods such as a forgetting factor filter.

Figure 17:
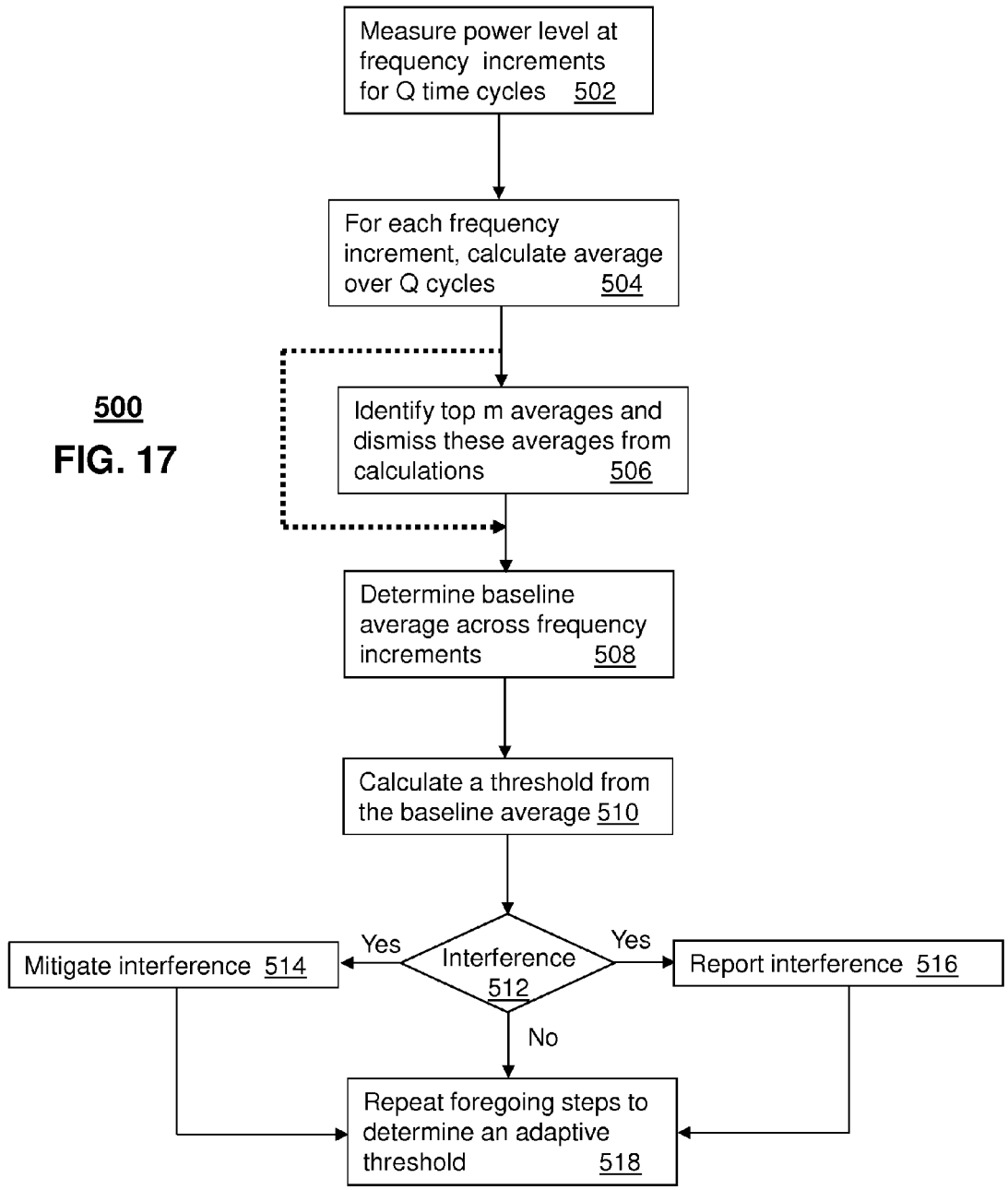
FIG. 17 depicts an illustrative embodiment of a method for detecting and mitigating interference signals shown in FIG. 16.

In one embodiment, an adaptive threshold can be determined by a method 500 as depicted in FIG. 17. Q defines how many cycles of $t_i$ to use (e.g., 100 cycles can be represented by $t_1$ thru $t_{100}$). The adaptive front end module 56 of FIG. 6 can be configured to measure power in 30 KHz increments starting from a particular RB and over multiple time cycles. For illustration purposes, the adaptive front end module 56 is assumed to measure power across a 5 MHz spectrum. It will be appreciated that the adaptive front end module 56 can be configured for other increments (e.g., 15 KHz or 60 KHz), and a different RF spectrum bandwidth. With this in mind, the adaptive front end module 56 can be configured at frequency increment f1 to measure power at t1, t2, thru tq (q representing the number of time cycles, i.e., Q). At f1+30 kHz, the adaptive front end module 56 measures power at t1, t2, thru tn. The frequency increment can be defined by f0+(z−1)*30 KHz=fz, where f0 is a starting frequency, where z=1 . . . x, and z defines increments of 30 KHz increment, e.g., f1=f(z=1) first 30 KHz increment, f2=f(z=2) second 30 KHz increment, etc.

The adaptive front end module 56 repeats these steps until the spectrum of interest has been fully scanned for Q cycles, thereby producing the following power level sample sets:

$S_{f1(t1\ thru\ tq)}$: $s_{1,t1,f1}, s_{2,t2,f1}, \ldots, s_{q,tq,f1}$
$S_{f2(t1\ thru\ tq)}$: $s_{1,t1,f2}, s_{2,t2,f2}, \ldots, s_{q,tq,f2}$
. . .
$S_{fx(t1\ thru\ tq)}$: $s_{1,t1,fx}, s_{2,t2,fx}, \ldots, s_{q,tq,fx}$ The adaptive front end module 56 in step 504, calculates averages for each of the power level sample sets as provided below:

a1(f1)=$(s_{1,t1,f1}+s_{2,t2,f1}, \ldots, +s_{q,tq,f1})/q$
a2(f2)=$(s_{1,t1,f1}+s_{2,t2,f2}, \ldots, s_{q,tq,f2})/q$
. . .
ax(fx)=$(s_{1,t1,fx}+s_{2,t2,fx}, \ldots, s_{2,tq,fx})/q$ In one embodiment, the adaptive front end module 56 can be configured to determine at step 506 the top "m" averages (e.g., the top 3 averages) and dismiss these averages from the calculations. The variable "m" can be user-supplied or can be empirically determined from field measurements collected by one or more base stations utilizing an adaptive front end module 56. This step can be used to avoid skewing a baseline average across all frequency increments from being too high, resulting in a threshold calculation that may be too conservative. If step 506 is invoked, a baseline average can be determined in step 508 according to the equation: Baseline Avg= (a1+a2+ . . . +az−averages that have been dismissed)/(x−m).

If step 506 is skipped, the baseline average can be determined from the equation: Baseline Avg=(a1+a2+ . . . +az)/x. Once the baseline average is determined in step 508, the adaptive front end module 56 can proceed to step 510 where it calculates a threshold according to the equation: Threshold=ydB offset+Baseline Avg. The ydB offset can be user defined or empirically determined from field measurements collected by one or more base stations utilizing an adaptive front end module 56.

Figure 18:
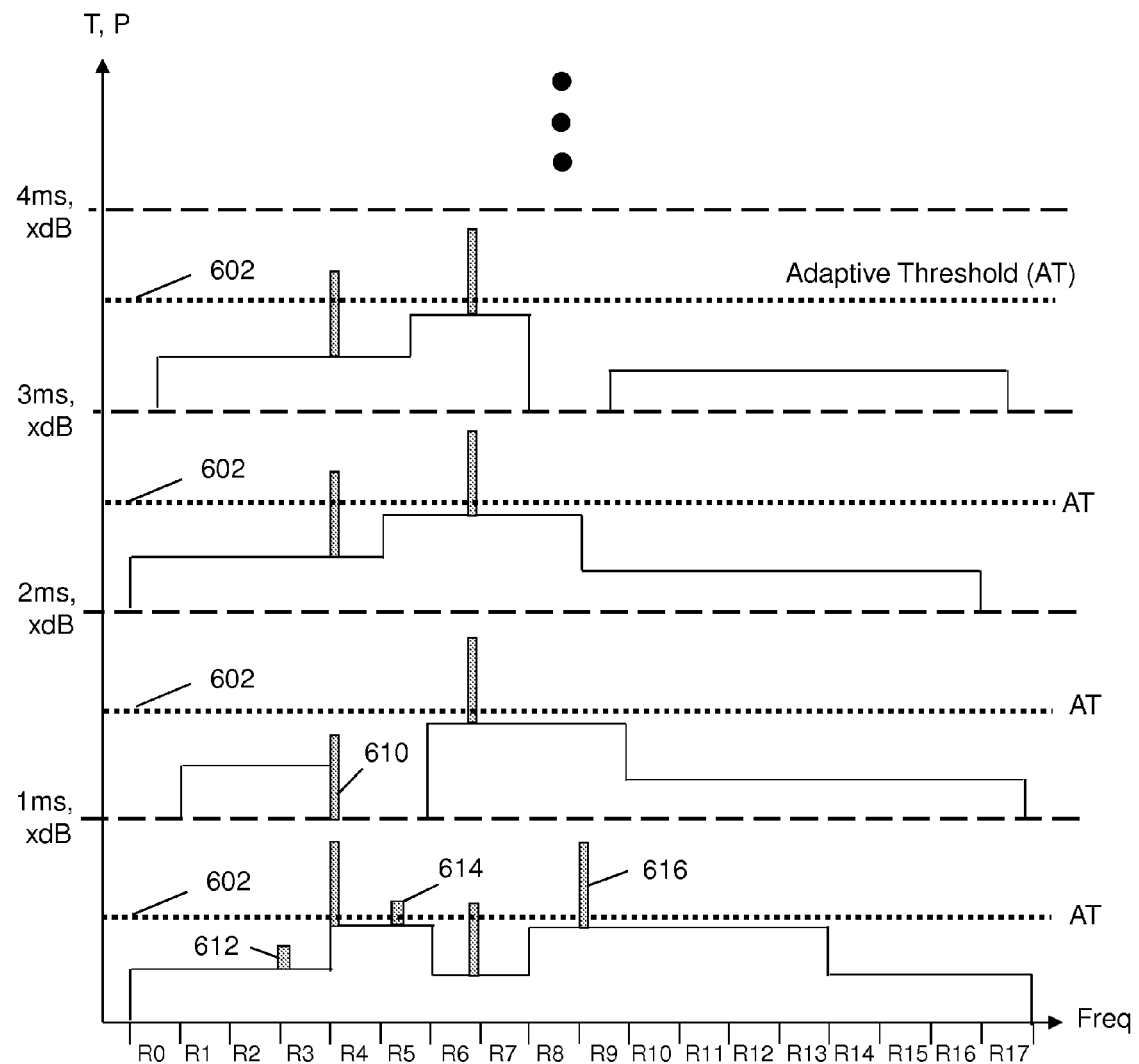
FIG. 18 depicts an illustrative embodiment of adaptive thresholds used for detecting and mitigating interference signals shown in FIG. 16.

Once a cycle of steps 502 through 510 have been completed, the adaptive front end module 56 can monitor at step 512 interference per frequency increment of the spectrum being scanned based on any power levels measured above the threshold 602 calculated in step 510 as shown in FIG. 18. Not all interferers illustrated in FIG. 18 exceed the threshold, such as the interferer with reference 610. Although this interferer has a high power signature, it was not detected because it occurred during a resource block (R4) that was not in use. As such, the interferer 610 fell below the threshold 602. In another illustration, interferer s 612 also fell below the threshold 602. This interferer was missed because of its low power signature even though the RB from which it occurred (R3) was active.

Method 500 can utilize any of the embodiments in the illustrated flowcharts described above to further enhance the interference determination process. For example, method 500 of FIG. 17 can be adapted to apply weights to the power levels, and/or perform correlation analysis to achieve a desired confidence level that the proper interferers are addressed. For example, with correlation analysis, the adaptive front end module 56 can be configured to ignore interferers 614 and 616 of FIG. 18 because their frequency of occurrence is low. Method 500 can also be adapted to prioritize interference mitigation. Prioritization can be based on frequency of occurrence of the interferers, time of day of the interference, the affect the interference has on network traffic, and/or other suitable factors for prioritizing interference to reduce its impact on the network. Prioritization schemes can be especially useful when the filtering resources of the adaptive front end module 56 can only support a limited number of filtering events.

Figure 19:
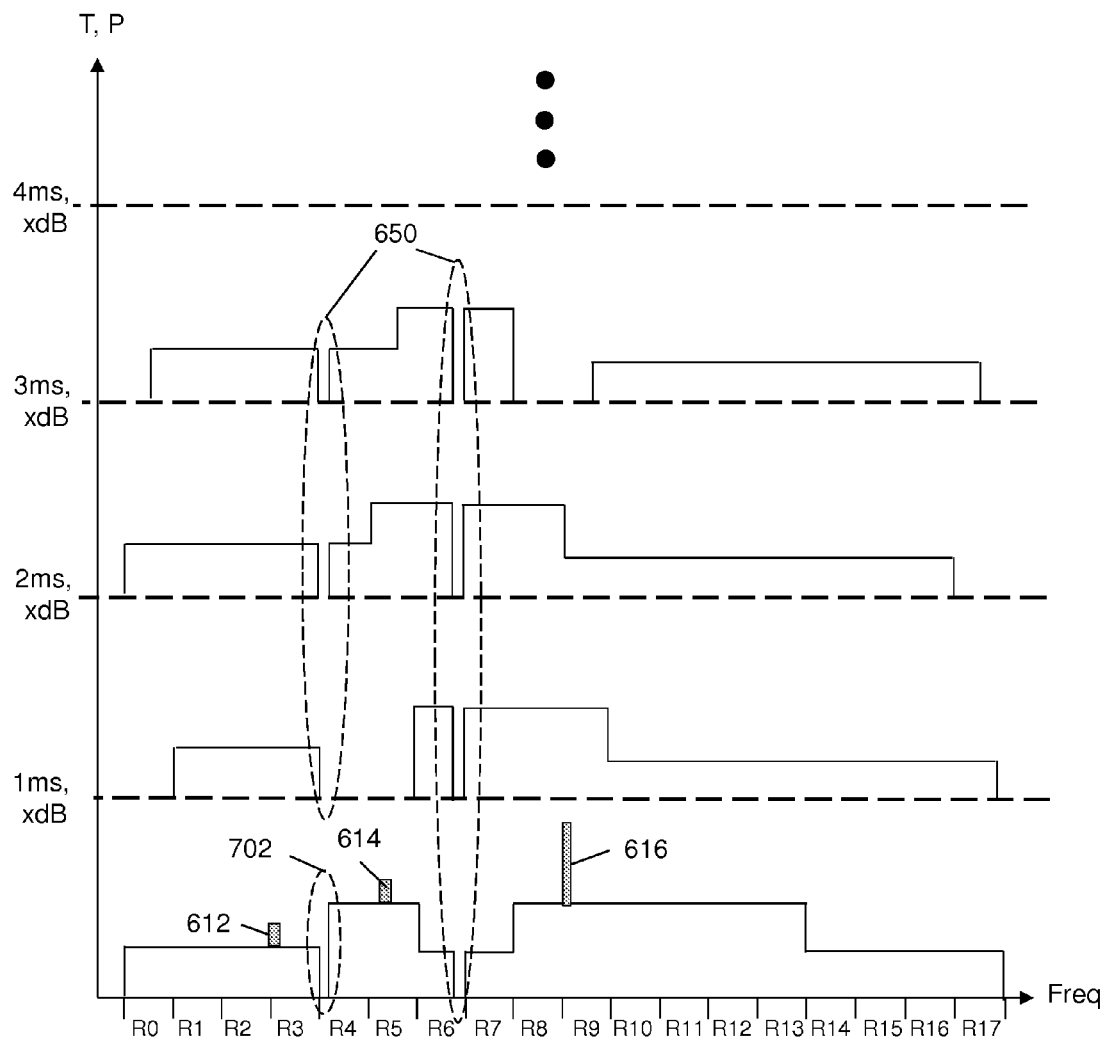
FIG. 19 depicts an illustrative embodiment of resulting LTE signals after mitigating interference according to the method of FIG. 17.

When one or more interferers are detected in step 512, the adaptive front end module 56 can mitigate the interference at step 514 by configuring one or more filters to suppress the one or more interferers as described above. When there are limited resources to suppress all interferers, the adaptive front end module 56 can use a prioritization scheme to address the most harmful interference as discussed above. FIG. 19 provides an illustration of how the adaptive front end module 56 can be suppress interferers based on the aforementioned algorithms of the subject disclosure. For example, interferers 612, 614 and 616 can be ignored by the adaptive front end module 56 because their correlation may be low, while interference suppression is applied for all other interferers as shown by reference 650.

In one embodiment, the adaptive front end module 56 can submit a report to a diagnostic system that includes information relating to the interferers detected. The report can including among other things, a frequency of occurrence of the interferer, spectral data relating to the interferer, an identification of the base station from which the interferer was detected, a severity analysis of the interferer (e.g., bit error rate, packet loss rate, or other traffic information detected during the interferer), and so on. The diagnostic system can communicate with other base stations with other operable adaptive front end module 56 to perform macro analysis of interferers such as triangulation to locate interferers, identity analysis of interferers based on a comparison of spectral data and spectral profiles of known interferers, and so on.

In one embodiment, the reports provided by the adaptive front end module 56 can be used by the diagnostic system to in some instance perform avoidance mitigation. For example, if the interferer is known to be a communication device in the network, the diagnostic system can direct a base station in communication with the communication device to direct the communication device to another channel so as to remove the interference experienced by a neighboring base station. Alternatively, the diagnostic system can direct an affected base station to utilize beam steering and or mechanical steering of antennas to avoid an interferer. When avoidance is performed, the mitigation step 514 can be skipped or may be invoked less as a result of the avoidance steps taken by the diagnostic system.

Once mitigation and/or an interference report has been processed in steps 514 and 516, respectively, the adaptive front end module 56 can proceed to step 518. In this step, the adaptive front end module 56 can repeat steps 502 thru 510 to calculate a new baseline average and corresponding threshold based on Q cycles of the resource blocks. Each cycle creates a new adaptive threshold that is used for interference detection. It should be noted that when Q is high, changes to the baseline average are smaller, and consequently the adaptive threshold varies less over Q cycles. In contrast, when Q is low, changes to the baseline average are higher, which results in a more rapidly changing adaptive threshold.

Generally speaking, one can expect that there will be more noise-free resource blocks than resource blocks with substantive noise. Accordingly, if an interferer is present (constant or ad hoc), one can expect the aforementioned algorithm described by method 500 will produce an adaptive threshold (i.e., baseline average+offset) that will be lower than interferer's power level due to mostly noise-free resource blocks driving down baseline average. Although certain communication devices will have a high initial power level when initiating communications with a base station, it can be further assumed that over time the power levels will be lowered to a nominal operating condition. A reasonably high Q would likely also dampen disparities between RB's based on the above described embodiments.

It is further noted that the aforementioned algorithms can be modified while maintaining an objective of mitigating detected interference. For instance, instead of calculating a baseline average from a combination of averages a1(f1) through ax(fx) or subsets thereof, the adaptive front end controller 56 can be configured to calculate a base line average for each resource block according to a known average of adjacent resource blocks, an average calculated for the resource block itself, or other information that may be provided by, for example, a resource block scheduler that may be helpful in calculating a desired baseline average for each resource block or groups of resource blocks. For instance, the resource block schedule can inform the adaptive front end module 56 as to which resource blocks are active and at what time periods. This information can be used by the adaptive front end module 56 determine individualized baseline averages for each of the resource blocks or groups thereof. Since baseline averages can be individualized, each resource block can also have its own threshold applied to the baseline average of the resource block. Accordingly, thresholds can vary between resource blocks for detecting interferers.

It is further noted that the aforementioned mitigation and detection algorithms can be implemented by any communication device including cellular phones, smartphones, tablets, small base stations, macro base stations, femto cells, WiFi access points, and so on. Small base stations (commonly referred to as small cells) can represent low-powered radio access nodes that can operate in licensed and/or unlicensed spectrum that have a range of 10 meters to 1 or 2 kilometers, compared to a macrocell (or macro base station) which might have a range of a few tens of kilometers. Small base stations can be used for mobile data offloading as a more efficient use of radio spectrum.

Figure 20:
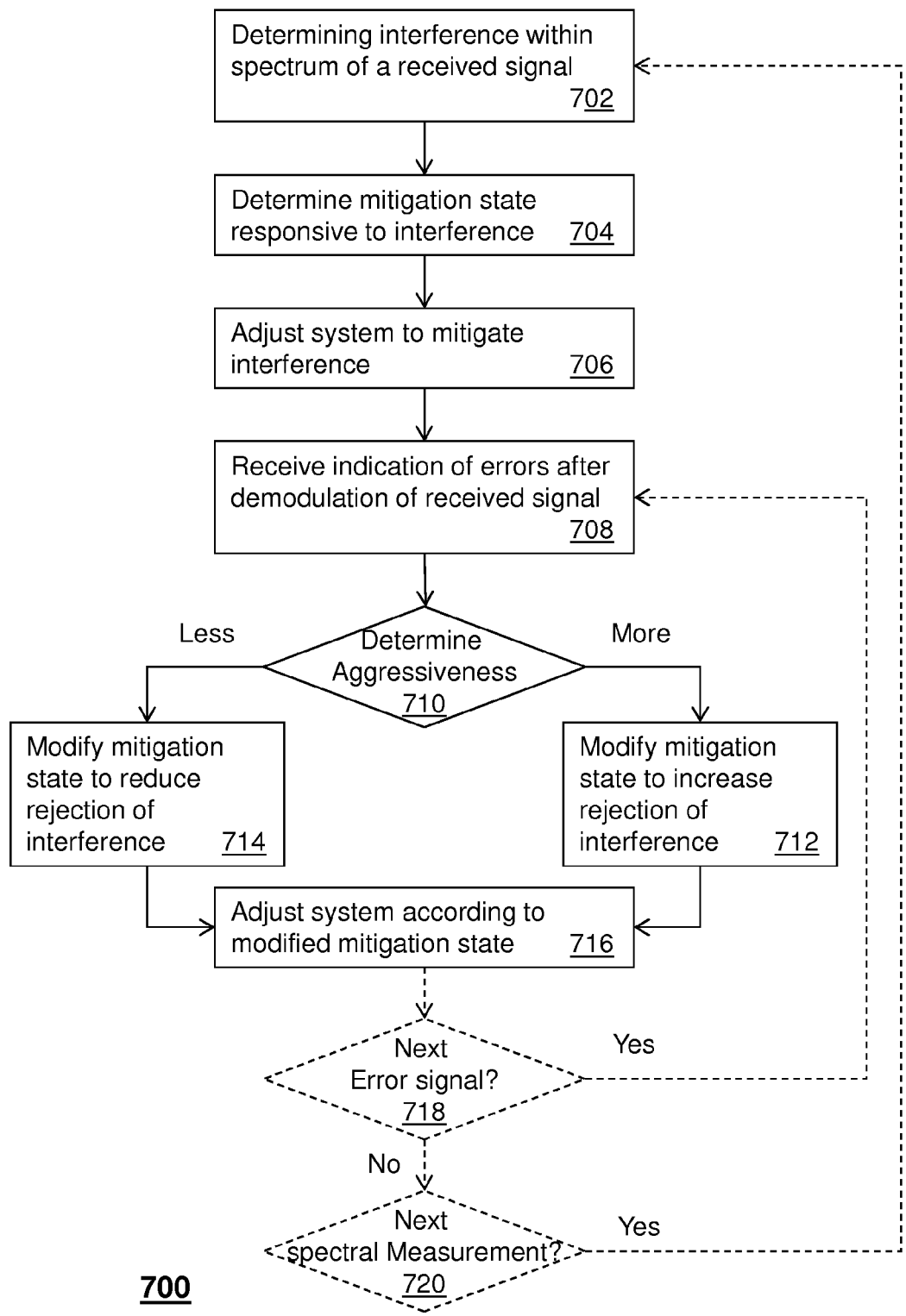
FIG. 20 depicts an illustrative embodiment of a method for detecting and mitigating interference signals shown in FIGS. 3, 16 and 18.

An illustrative embodiment of an interference mitigation process 700 is shown in FIG. 20. Interference within a spectrum of a received signal is determined at 702. The interference can be actual interference, e.g., measured contemporaneously or otherwise detected according to any of the techniques disclosed herein. The interference can also be anticipated or expected. For example, a base station operating from a fixed location may be subjected to interference from various sources—some fixed and some mobile. Such interference can be documented or otherwise accounted for in an interference database associated with the particular base station. It is also possible that characteristics of such "known" interferers can be determined, either from historical observations, site surveys, or combinations thereof, and accounted for in the interference database. Such characteristics can include one or more of signal strength, spectral width, spectral shape, and the like. It is also understood that such interference sources might vary according to a predictable schedule, or randomly.

Whether interference is determined by contemporaneous measurement, prediction, or some combination thereof, one or more system parameters, and/or elements, such as filters, can be implemented to mitigate any undesirable effects of the interference. A mitigation state, e.g., a filter state, is determined responsive to interference at 704, and a system parameter, e.g., an adaptive filter, is adjusted according to the determined mitigation state at 706 to mitigate the interference. Although the examples disclosed herein including interference filters refer to such filters being applied in a receiver, it is understood that such filter, or more generally, such mitigation states and/or system configurations, can also be applied in a transmitter, for example, to mitigate generation of unwanted transmitter effects, such as intermodulation, distortion, to implement avoidance techniques, and the like.

Determination of a mitigation state, e.g., a filter state, given a detected or otherwise expected interferer can include one or more system parameter configurations, such as filter control signals configured to adjust the adaptive filter according to a desired filter transfer function. The nature of the filter control signals can depend upon the particular architecture of the filter, e.g., analog, e.g., referring to circuit and/or switch settings, or digital, e.g., referring to coefficient value(s). A filter's transfer function generally determines the filter's performance, including its frequency of operation, e.g., corner frequency for a high-pass and/or low-pass filters, a center frequency for bandpass and/or notch filters. Other performance parameters can include the filters shape, including the shape and/or slope of its edges, depth of its notch, etc.

A desired transfer function can be determined according to any of various techniques. For example, a standard, or baseline, transfer function can be used for any interference, such as a notch having a predetermined width and depth. The center frequency of the notch can be determined according to a location of the interference, such that the notch operates to mitigate the effect of the interference on the receiver and/or transmitter. It is understood that more than one standard, or baseline, filter transfer functions can be included in a library of interference filters, e.g., according to filter sates. These can include without limitation various classes of filters, such as bandpass filters, low-pass filters, high-pass filters, notch filters, and the like. Such a library of baseline filter states can include more than one predetermined transfer function for each class of filters. For example, two or more notch filters of different depths, widths, etc.

Alternatively or in addition, a class and/or transfer function of an interference filter can be determined according to a measurement, e.g., a contemporaneous measurement of the interference. Such measurements can identify one or more of a frequency, a bandwidth or an amplitude, e.g., signal power, to an intended signal and/or noise floor. Once the interferer has been characterized or otherwise estimated, a suitable transfer function can be determined to mitigate any undesirable effects of the interferer, such as an increased error rate, e.g., bit error rate (BER), a loss of packets, a loss of synchronization, etc.

Once the system has been pre-adjusted, e.g., the adaptive filter has been configured and applied to the intended signal, an indication of error performance of the filtered signal is determined. The error performance can be determined after demodulation at 708, for example, in the form of a bit error rate. The information bearing signal includes one or more modulated carriers conveying information encoded on to the carriers at an information source. The bit error rate can be measured directly, e.g., using a bit error rate test set, or similar device, e.g., comparing values of received data bits to known values of the corresponding source bits, e.g., using a comparator, counting occurrences of unfavorable comparisons and forming a ratio to a total number of bits compared during a measurement period.

Alternatively or in addition, a measure of error performance can be determined according to an error detection and/or correction function implemented after the demodulator. As disclosed herein, such error detection and/or correction techniques are well understood, e.g., by encoding information at a source according to structured sequences that allow a receiver to determine whether the information of a segment of bits, e.g., a block, a packet, or the like, has been received with or without error. Encoding of such structured sequences can include the addition of redundant bits, e.g., in the form of one or more parity bits, or bits resulting from a hash function applied to the source data, or the like. The parity and/or hash functions can be repeated at a receiver and the results compared to the parity and/or hash bits provided in the signal. A successful match suggests that no errors have occurred; whereas, an unsuccessful match suggests one or more errors have occurred.

In addition to simply detecting errors by way of the redundant bits of a structured code, it can also be possible to correct at least some of the errors. Such codes are generally referred to as error correction codes, e.g., referred to generally as forward error correction (FEC). Such error-correcting codes can be generally categorized into block codes that work on fixed-size blocks, e.g., packets, of bits or symbols of a predetermined size and convolutional codes that work on bit or symbol streams of arbitrary length. Some examples, without limitation, include Reed-Solomon coding, Golay coding, Hamming codes, BCH coding, and multidimensional parity. In some instances error-correcting codes are decoded by the Viterbi algorithm.

Decoders applying FEC can provide an indication of error performance, for example, by providing one or more status indications, e.g., signals, related to one or more of good code words received, corrected code words received and/or uncorrected code words received. Such status indications can be provided in real time, e.g., changing with each block or packet of bits or symbols analyzed. Alternatively or in addition, one or more counters can be incorporated to track a total number of occurrences of any of the tracked performance features over a reporting period.

Other error correcting techniques include automatic receive request techniques in which one or more indicators can be used to track good packets, e.g., without errors (ACK) and/or bad packets with errors (NAK). Such tracking can be performed by monitoring such acknowledgement and/or negative acknowledgement messages provided by the error detection and/or correction module.

An aggressiveness of the mitigation state, e.g., setting(s) of the adaptive filter, can be determined at 710, according to the error performance monitored at 708. For example, an indication that no errors are being/have been received might indicate that the mitigation state, or elements and/or adjustments or settings of the system, e.g., the interference filter, is/are appropriately mitigating any interference. Under such a scenario it may be determined that no modification of the present mitigation state, e.g., the filter, is necessary—status quo. In some embodiments, a lack of errors, or a relatively low number of errors, e.g., under a predetermined minimum tolerable error threshold can suggest that the system mitigation state and/or settings, e.g., the adaptive filter, can be adjusted to a less aggressive state. Alternatively, a presence of errors above an intolerable error threshold, and/or a loss of or intermittent synchronization can suggest interference remains and that the adaptive filter should be adjusted to a more aggressive state.

To the extent it is determined that more aggressive mitigation state, e.g., filter state, is appropriate, e.g., to increase rejection of interference and/or avoidance, an updated mitigation state, such as an updated filter state, can be determined at 712. For example, an updated filter state can modify one or more characteristics of the adaptive filters transfer function, such as its spectral width, depth, slope, shape, and the like. In some embodiments, one or more of the filter characteristics can be changed in a systematic manner. For example, in response to first detecting that a more aggressive filter state should be applied, a width of a notch filter can be increased from a current setting, e.g., a default setting, by a predetermined amount, e.g., a percentage of a prior setting, such as an increase of 10%, 50%, 100%, etc. Alternatively or in addition, a depth of a notch filter can be increased by a predetermined amount, e.g., by a predetermined number of decibels (dB), e.g., 3 dB, 6 dB, 10 dB, etc., and/or a shape of the filter can be adjusted, e.g., from one having a gradual roll off, to one having a more substantial roll off.

In at least some embodiments, such systematic approaches to determining an updated or adjusted mitigation state, e.g., filter state, can be applied in an iterative manner. For example, a filter width can be adjusted first in response to received error(s) at 708, followed by a depth of a notch and/or shape in response to subsequently received error(s) at 708. Iterative updates can adjust multiple values in each characteristic or a filter's transfer function before advancing to a different characteristic of the transfer function, or apply different characteristics in an alternative manner, including alone or in combination. To the extent it is determined that less aggressiveness is appropriate, the filter can be adjusted to reduce rejection of interference at 714. Adjustments can be made in a similar manner to the aforementioned techniques for adjusting to be more aggressive, instead, with adjustments being made less aggressive. This one or more of filter widths, notch depths, filter shapes, e.g., roll offs, can be reduced. After an adjustment to the filter state has been determined, the filter is adjusted to mitigate interference at 716.

The adjusted mitigation state, e.g., filter state, can be saved, e.g., stored in memory, as the new current mitigation state.

Future adjustments to the mitigation state, if necessary, can be made in reference to the current mitigation state. In at least some embodiments, prior mitigation states or at least an indication thereof are also retained, e.g., stored in memory. Such prior mitigation state information can be used in iterative approaches, e.g., to determine a next step in the iterative approach, based on the current performance, e.g., error(s), a current mitigation state, and one or more prior mitigation states. It is also conceivable that in at least some situations, increasing aggressiveness of a mitigation state can result in diminishing returns. Consider a situation in which a filter's width is increased in an attempt to mitigate an interferer, but the increase causes a portion of the intended signal to be removed. If too much of the intended signal is removed, filter itself could be contributing to error(s), causing an increase in error(s), despite the filter adjustment having been made in attempt to mitigate interference. In such instances, noting the negative performance associated with a prior filter adjustment, a new adjustment can be made in an opposite sense, e.g., reducing a bandwidth where it had previously been increased, thereby reducing a filter depth where it had previously been increased, and the like. Such an approach can result in a balance between aggressive filtering to mitigate interference and over-filtering causing increased error(s).

Due to the often unpredictable nature of interference, and/or the combined effects of an interferer with changing channel parameters, the filter adjustment process can be repeated at 718 to maintain a desired level of performance, e.g., error(s), BER, SINR, etc. For example, an updated error signal can be determined at 708, e.g., for each block or packet received, and the need for modifying the mitigation, e.g., adaptive filter's, aggressiveness reexamined at 710, modifying the mitigation, e.g., filter, adjustment accordingly at 712 or 714 and re-adjusting the system parameter, e.g., filter, at 716. The process can be repeated multiple times within a single block or packet, for each block or packet, or for some representative sample of blocks or packets, e.g., every other block or packet, or every tenth block or packet represented in a received signal, etc.

It is also understood that the process 700 can be repeated for more than one interferer at a time. Consider two interference filters applied to notch filter two narrowband interferers within the same wideband channel. The process 700 could be repeated simultaneously or sequentially for each configurable system element and/or adjustable parameter, e.g., filter, adjusting the respective filter parameters as disclosed herein. In some embodiments, a determination of aggressiveness can be made once and applied to multiple adaptive filters simultaneously. As the occurrence of interferers can change with time, it is also understood that new and/or different filter settings, e.g., filter baseline settings, can be updated according to the presence and/or absence of a particular interferer. Thus, the process 700 can be repeated, as required, upon the detection of a change in interference signals, e.g., during updated spectral measurements at 720.

In some applications, the error performance can be determined at an error correction module of a base station, e.g., within a cellular radio network. The error correction module provides a signal or suitable message to an adaptive filtering system indicating an extent of errors. As disclosed herein, such indications of errors can include bit error rate, retransmission requests, and the like. The adaptive filtering system uses the message to determine how aggressively to adjust an interference filter, e.g., how far to widen a filter's notch before error correction fails. Depending upon the particular application, information available from the base station, such as a ratio of data channels to voice channels, can be used as an indicator to determine how aggressive to set the adaptive filtering system.

Although the examples disclosed herein refer to an error detection and/or correction module after the demodulator at the receiver, it is understood that the process, e.g., the process 700 (FIG. 20) can be implemented more generally in a signal processor without limitation. The signal processor can be the base station signal processor, or some other signal processor, for example, remotely located at a radio access network controller, or an online, e.g., Web service. More generally, the techniques disclosed herein, such as the process 700 can be implemented in any communication device, such as base stations, mobile communication devices, such as cell phones, wireless access points, such as WiFi access points, sub-targets, and the like.

Figure 21:
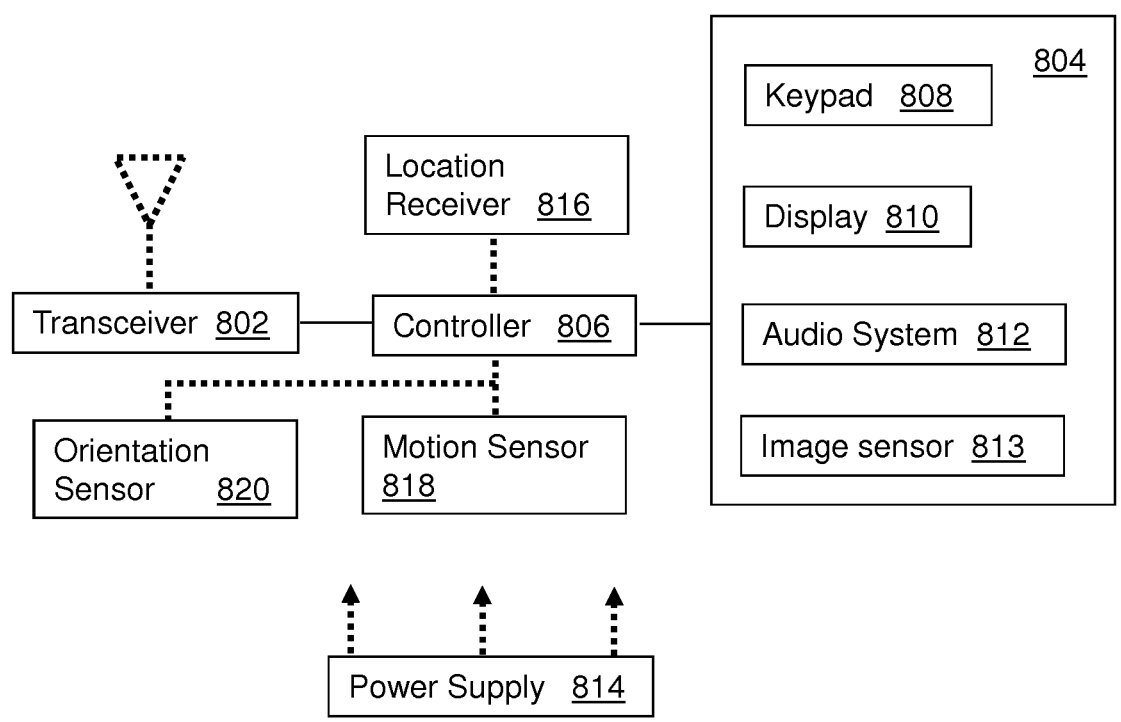
FIG. 21 depicts an illustrative embodiment of a communication device that can utilize in whole or in part embodiments of the subject disclosure for detecting and mitigating interference.

An illustrative embodiment of a communication device 800 is shown in FIG. 21. Communication device 800 can serve in whole or in part as an illustrative embodiment of the devices depicted in FIGS. 1, 4, and 6-8. In one embodiment, the communication device 800 can be configured, for example, to perform operations such as measuring a power level in at least a portion of a plurality of resource blocks occurring in a radio frequency spectrum, where the measuring occurs for a plurality of time cycles to generate a plurality of power level measurements, calculating a baseline power level according to at least a portion of the plurality of power levels, determining a threshold from the baseline power level, and monitoring at least a portion of the plurality of resource blocks for signal interference according to the threshold. Other embodiments described in the subject disclosure can be used by the communication device 700.

To enable these features, communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 21 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 21. These variant embodiments can be used in one or more embodiments of the subject disclosure.

The communication device 800 can be adapted to perform the functions of the media processor 406, the media devices 408, or the portable communication devices 416 of FIG. 4, as well as the IMS CDs 501-502 and PSTN CDs 503-505 of FIG. 5. It will be appreciated that the communication device 800 can also represent other devices that can operate in communication systems 400-500 of FIGS. 4-5 such as a gaming console and a media player.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 22:
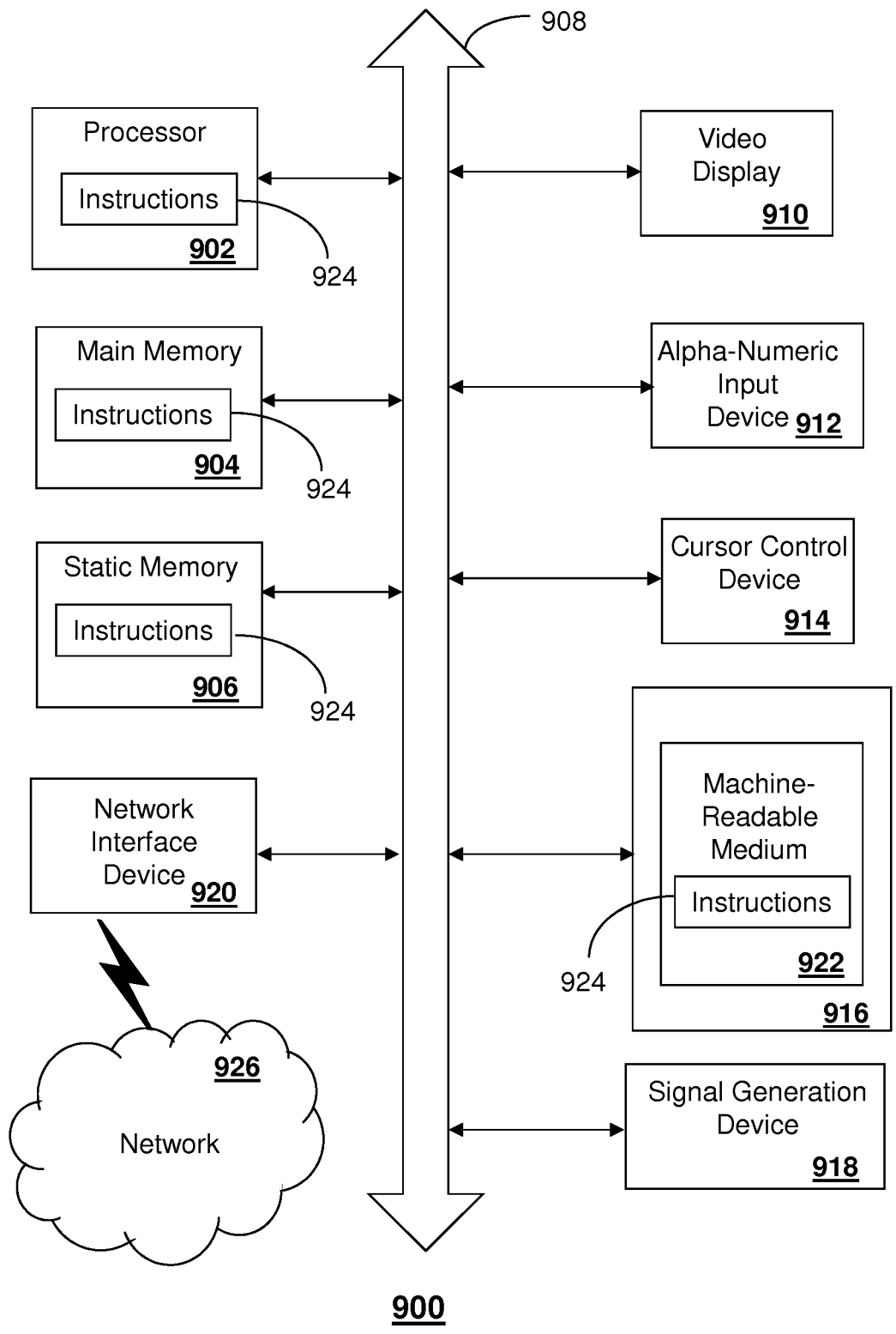
FIG. 22 is a diagrammatic representation of a machine in the form of a computer system within which a set of instructions, when executed, may cause the machine to perform any one or more of the methods described herein.

FIG. 22 depicts an exemplary diagrammatic representation of a machine in the form of a computer system 900 within which a set of instructions, when executed, may cause the machine to perform any one or more of the methods described above. One or more instances of the machine can operate, for example, as the devices of FIGS. 1, 4, and 6-9, and/or one or more components of such devices. In some embodiments, the machine may be connected (e.g., using a network 926) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display. The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   measuring, by a system comprising a processor, a plurality of power levels associated with a first plurality of frequency segments over a first radio frequency spectrum of a first wireless communication system, wherein the plurality of power levels are measured over a plurality of time cycles;

calculating, by the system, a first plurality of average power levels for the first plurality of frequency segments;

eliminating, by the system, a highest average power level from the first plurality of average power levels to generate a baseline plurality of average power levels;

averaging, by the system, the baseline plurality of average power levels to determine a baseline average power level for the first radio frequency spectrum;

determining, by the system, a threshold from the baseline average power level for detecting signal interference in the first plurality of frequency segments occurring in the first radio frequency spectrum of the first wireless communication system;

determining, by the system, interference within a frequency spectrum of an information bearing signal received at an input terminal according to the threshold for detecting signal interference, wherein the information bearing signal comprises a modulated carrier waveform;

determining, by the system, a mitigation state responsive to the determining of the interference;

adjusting, by the system, a system parameter, resulting in an pre-adjusted system parameter, according to the mitigation state;

receiving, by the system, a first error signal indicative of errors corrected within information obtained by demodulation of the modulated carrier waveform of a signal received according to the pre-adjusted system parameter;

determining, by the system, a modified mitigation state in response to the first error signal; and adjusting, by the system, the pre-adjusted system parameter according to the modified mitigation state.

2. The method of claim 1, wherein demodulation of the modulated carrier waveform produces a structured sequence comprising redundant bits usable for one of detection of errors, correction of errors or both, within the structured sequence.

3. The method of claim 2, wherein the first error signal is indicative of errors corrected within the structured sequence, wherein the structured sequence comprises block encoding.

4. The method of claim 3, wherein the structured sequence comprises forward error correction comprising redundant bits that are usable to correct errors within the structured sequence.

5. The method of claim 1, wherein the mitigation state comprises a filter state of a filter provided between the input terminal and a demodulator, the pre-adjusted system parameter comprises a pre-adjusted filter adjusted according to the filter state, and wherein the filter comprises a transfer function to reject a portion of the signal interference, the adjusting of the filter comprising one of adjusting the transfer function to reject a greater portion of the signal interference or adjusting the transfer function to reject a lesser portion of the signal interference.

6. The method of claim 5, wherein the adjusting of the transfer function comprises adjusting of one of a filter width, a filter depth, a filter shape, or a combination thereof.

7. The method of claim 1, further comprising:

receiving, by the system, a second error signal indicative of errors detected within information obtained by demodulation of the modulated carrier waveform;

determining, by the system, a re-modified mitigation state in response to one of the second error signal or the first and second error signals; and adjusting, by the system, the system parameter according to the re-modified mitigation state.

8. A device, comprising:

a memory to store instructions; and a processor in communication with the memory, wherein responsive to executing the instructions, the processor performs operations comprising:

measuring, over a plurality of cycle times, power levels associated with frequency segments over a first radio frequency spectrum of a first wireless communication system;

generating average power levels for the frequency segments from the power levels that are measured;

eliminating a highest average power level from the average power level to generate a baseline average power level for the frequency segments;

determining a threshold from the baseline average power level for detecting signal interference in the frequency segments of the first radio frequency spectrum of the first wireless communication system;

determining a filter state to mitigate the signal interference, wherein the filter state is determined based on the signal interference that is detected via the threshold;

adjusting a filter according to the filter state, wherein the filter is provided between an input terminal and a demodulator to filter an information bearing signal comprising a modulated carrier received at the input terminal, resulting in a filtered signal;

receiving a first error signal indicative of errors corrected within information obtained by demodulation of the modulated carrier of the filtered signal;

determining a modified filter state in response to the first error signal; and adjusting the filter according to the modified filter state.

9. The device of claim 8, wherein demodulation of the modulated carrier produces a structured sequence comprising redundant bits usable for one of detection of errors, correction of errors or both, within the structured sequence.

10. The device of claim 9, wherein the first error signal is indicative of errors corrected within the structured sequence.

11. The device of claim 9, wherein the redundant bits of the structured sequence are usable to correct errors within the structured sequence.

12. The device of claim 8, wherein the filter comprises a transfer function to reject a portion of the signal interference, the adjusting of the filter comprising one of adjusting the transfer function to reject a greater portion of the interference or adjusting the transfer function to reject a lesser portion of the signal interference.

13. The device of claim 12, wherein the adjusting of the transfer function comprises adjusting of one of a filter width, a filter depth, a filter shape, or a combination thereof.

14. The device of claim 8, wherein the operations further comprise:

receiving a second error signal indicative of errors detected within information obtained by demodulation of the modulated carrier;

determining a re-modified filter state in response to one of the second error signal or the first and second error signals; and adjusting the filter according to the re-modified filter state.

15. A machine-readable storage device comprising instructions that when executed by a processor, cause the processor to perform operations comprising:

measuring, over a plurality of cycle times, power levels associated with frequency segments over a first radio frequency spectrum of a first wireless communication system;

generating average power levels for the frequency segments from the power levels that are measured;

eliminating a highest average power level from the average power level to generate a baseline average power level for the frequency segments;

determining a threshold from the baseline average power level for detecting signal interference in the frequency segments of the first radio frequency spectrum of the first wireless communication system;

adjusting a filter in electrical communication between an input terminal and a demodulator to filter an information bearing signal received at the input terminal, resulting in a filtered signal, wherein the adjusting of the filter is based on the signal interference that is detected;

receiving an error signal indicative of errors corrected within information obtained by demodulation of a modulated carrier of the filtered signal;

determining a modified filter state in response to the error signal; and adjusting the filter according to the modified filter state.

16. The machine-readable storage device of claim 15, wherein demodulation of the modulated carrier produces a structured sequence comprising redundant bits usable for one of detection of errors, correction of errors or both, within the structured sequence.

17. The machine-readable storage device of claim 16, wherein the error signal is indicative of errors corrected within the structured sequence.

18. The machine-readable storage device of claim 16, wherein the redundant bits of the structured sequence are usable to correct errors within the structured sequence.

19. The machine-readable storage device of claim 15, wherein the filter comprises a transfer function to reject a portion of the signal interference, the adjusting of the filter comprising one of adjusting the transfer function to reject a greater portion of the signal interference or adjusting the transfer function to reject a lesser portion of the signal interference.

20. The machine-readable storage device of claim 19, wherein the adjusting of the transfer function comprises adjusting of one of a filter width, a filter depth, a filter shape, or a combination thereof.

\* \* \* \* \*